(12) United States Patent
Yamamoto

(10) Patent No.: US 7,220,002 B2
(45) Date of Patent: May 22, 2007

(54) COLOR SEPARATION AND SYNTHESIS SYSTEMS, COLOR SEPARATION SYSTEMS AND COLOR SYNTHESIS SYSTEMS, ILLUMINATION OPTICAL SYSTEMS, PROJECTION OPTICAL SYSTEMS, AND PROJECTION DISPLAY DEVICES USING THESE SYSTEMS

(75) Inventor: Chikara Yamamoto, Kodaira (JP)

(73) Assignee: Fujinon Corporation, Saitama City (JP)

( * ) Notice: Subject to any disclaimer, the term of this patent is extended or adjusted under 35 U.S.C. 154(b) by 302 days.

(21) Appl. No.: 10/954,185

(22) Filed: Oct. 1, 2004

(65) Prior Publication Data
US 2005/0073651 A1 Apr. 7, 2005

(30) Foreign Application Priority Data
Oct. 1, 2003 (JP) .............................. 2003-343687

(51) Int. Cl.
*G03B 21/14* (2006.01)
(52) U.S. Cl. ........................... 353/20; 353/31; 359/634
(58) Field of Classification Search ................. 353/20, 353/31, 33, 34, 37; 359/490, 495, 496, 501, 359/502, 629, 634
See application file for complete search history.

(56) References Cited

U.S. PATENT DOCUMENTS 5,267,029 A * 11/1993 Kurematsu et al. ......... 348/751
5,648,870 A * 7/1997 Mistutake .................. 359/487
6,123,424 A * 9/2000 Hayashi et al. .............. 353/20

FOREIGN PATENT DOCUMENTS

JP 2001-100155 4/2001

* cited by examiner

*Primary Examiner*—William C. Dowling
(74) *Attorney, Agent, or Firm*—Arnold International; Jon W. Henry; Bruce Y. Arnold

(57) ABSTRACT

Color separation and synthesis systems, color separation systems and color synthesis systems, illumination optical systems, projection optical systems, and projection display devices using these systems include a wavelength-splitting element that reflects linearly polarized light of one wavelength and transmits light of another wavelength; a polarization-transforming element that changes the direction of polarization of linearly polarized light of one wavelength and that is arranged adjacent and at least nearly parallel to the wavelength-splitting element; and a polarization-sensitive beam splitter that reflects light having one direction of linear polarization and transmits light with another linear polarization. These systems provide for dividing and combining three linearly polarized light beams of different wavelengths so that they provide imaging beams to and from display elements, such as LCOSs, that can produce a high quality full color image with fewer optical elements in the various systems and the projection display device.

14 Claims, 14 Drawing Sheets

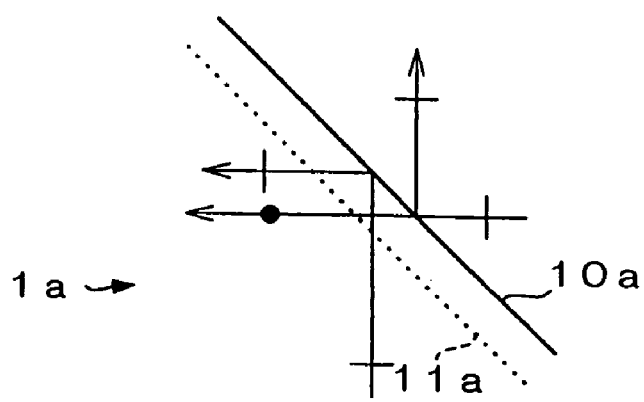
1a →  Fig. 1
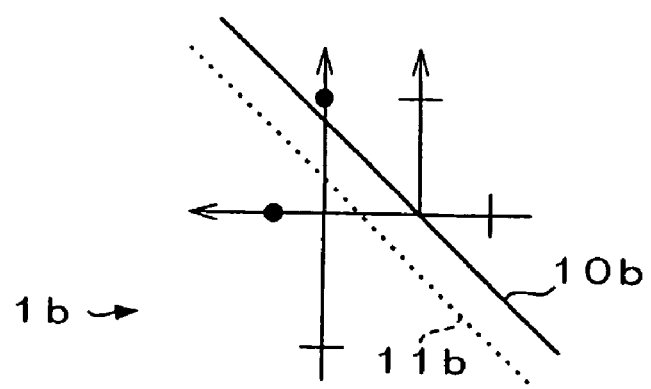
1b →  Fig. 2
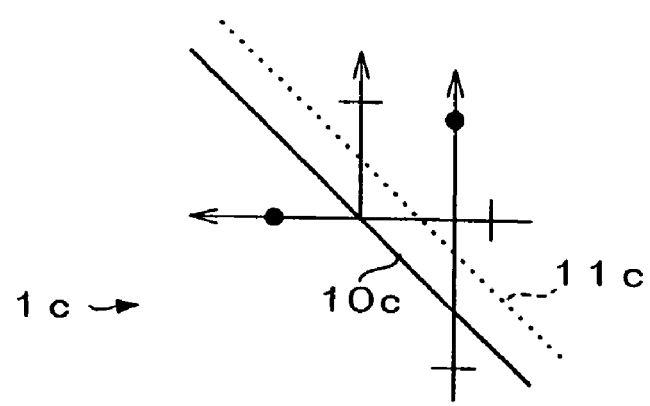
1c →  Fig. 3
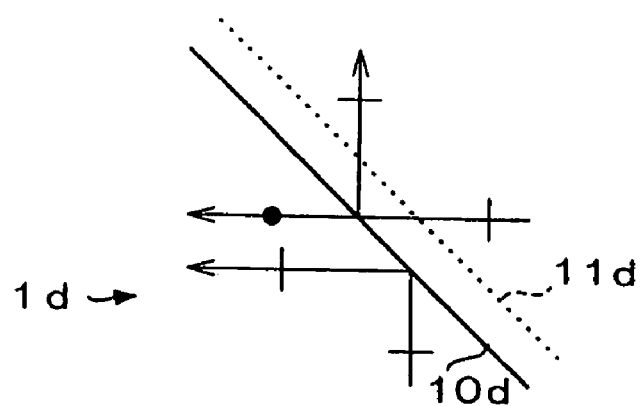
1d →  Fig. 4

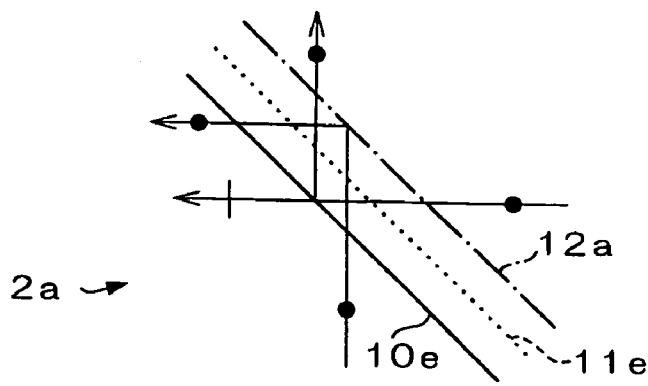
2a ➝    Fig. 5
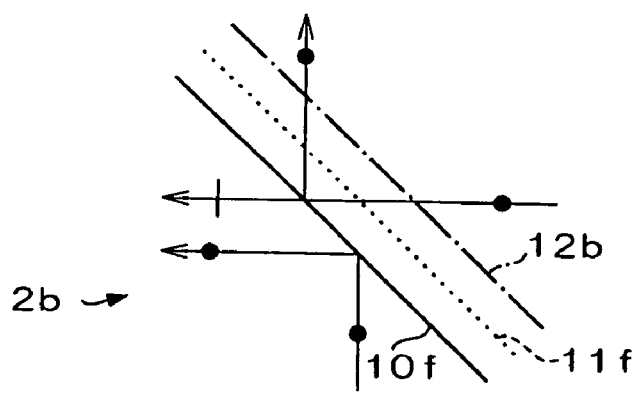
2b ➝    Fig. 6
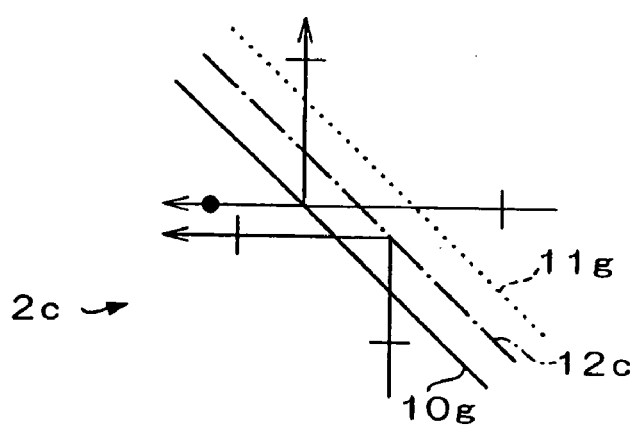
2c ➝    Fig. 7
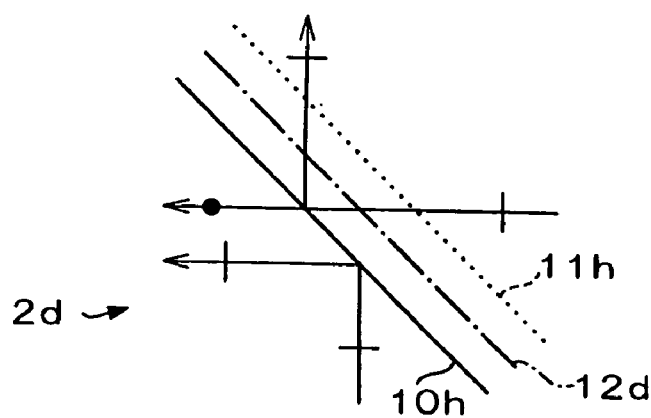
2d ➝    Fig. 8

COLOR SEPARATION AND SYNTHESIS SYSTEMS, COLOR SEPARATION SYSTEMS AND COLOR SYNTHESIS SYSTEMS, ILLUMINATION OPTICAL SYSTEMS, PROJECTION OPTICAL SYSTEMS, AND PROJECTION DISPLAY DEVICES USING THESE SYSTEMS

FIELD OF THE INVENTION

The present invention relates to separation and/or synthesis systems of light beams according to polarization and wavelength characteristics of the light beams. Additionally, the present invention relates to projection display devices that use such systems in their illumination optical systems and/or their projection optical systems and that use light beams that are modulated with image information by display elements for magnified projection, and especially relates to such projection display devices that use reflection-type display elements with polarization changing properties, such as some liquid crystal display elements.

BACKGROUND OF THE INVENTION

In recent years, the projector market has been growing rapidly, along with the use of personal computers. Liquid crystal display elements of the transmission-type and the reflection-type, and DMD display elements which include micromirrors in an orderly array, are known as light valves that modulate light in order to produce image light signals. In particular, an image display device of the reflection-type is suitable to create very small picture elements with high efficiency, and therefore it has gained attention as an image display device for producing a high quality image.

Various projection display devices have been developed that use reflection-type display elements and polarization properties of light beams. For instance, projection display devices that illuminate reflection-type display elements with polarization changes after color separation of the light beams according to wavelengths from a light source by an illumination optical system with a projection optical system that use four polarization-sensitive beam splitters, generally known as a COLORQUAD™, and that project imaging light beams from the reflection-type display elements, are known. FIG. 26 and FIG. 27 are cross-sectional diagrams of prior art Example 1 and prior art Example 2 of such devices. In FIG. 26 and FIG. 27, light beam channels corresponding to each of the three primary colors of light are shown as straight lines, and short intersecting lines and the black round shapes shown on these lines indicating the paths of the three light beams indicate one of two polarization states (S polarized light or P polarized light) of each of the light beams at particular locations in the projection display devices. In the following descriptions, the short intersecting lines are called the first polarization state and the black round shapes are called the second polarization state of the light beams.

Light from a light source (not shown), enters from the bottom as shown in FIG. 26 and FIG. 27 (into COLORQUAD™ 159 as shown in FIG. 26) as three different colors with their polarization states adjusted to be the same (the first polarization state). The light is separated into light beams of the three primary colors in the color quad 159. The light beams are modulated by the three reflection-type, liquid crystal panels 153a, 153b, and 153c, in particular LCOS (Liquid Crystal On Silicon), that are reflection-type display elements with polarization properties for modulating the light beams of the three primary colors with image information. A light beam that contains the image information of all three colors is synthesized and emitted from the COLORQUAD™, projected by the projection optical system 162d, and a full color image is formed on a screen (not shown). Each of the three different light paths shown in FIG. 26 may correspond to any one of the three primary colors blue, green and red in the following description of the operation of the COLORQUAD™ 159.

As shown in FIG. 26, in the COLORQUAD™ 159, four polarization-sensitive beam splitters (which term may hereinafter be abbreviated as PBSs) 170a, 150a, 150b, and 160a are arranged so that their internal polarization-sensitive filters 171, 151a, 151b, and 161, respectively, are aligned in the shape of the letter X. The first PBS is an illumination light beam separation element 170a; the second PBS is an optical path separation element 150a; the third PBS is an optical path separation element 150b; and the fourth PBS is a projection light beam synthesis element 160a. The COLORQUAD™ 159 includes first through third LCOS, 153a, 153b, and 153c, first through fourth wavelength-specific, polarization-transforming elements 143a, 143b, 143c, and 143d, first through third polarizing plates 142a, 142b, and 142c, and quarter-wave plates 152a, 152b, and 152c. Furthermore, in order to improve contrast of the projected image, the following arrangements are made: the polarizing plate 142a adjusts the polarization direction of an incident illumination light beam to the first polarization state; the polarizing plate 142b adjusts the polarization direction of the second color light beam which is incident thereon to the second polarization state; and the polarizing plate 142c adjusts the polarization direction of a projection light beam to the second polarization state. Furthermore, the wavelength-specific, polarization-transforming elements 143a, 143b, and 143d are elements for rotating the direction of linear polarization a specified angle. The wavelength-specific, polarization-transforming elements 143a and 143d transform the second color light beam to the second polarization state from the first polarization state, and the wavelength-specific, polarization-transforming elements 143b and 143c transform the first color light beam to the second polarization state from the first polarization state.

Illumination light beam separation element 170a receives light from the light source (not shown) and interiorly reflects part of the light to optical path separation element 150b and transmits part of the light to optical path separation element 150a, and projection light beam synthesis element 160a receives light from optical path separation elements 150a and 150b to synthesize the light beams to form a projection light beam.

Additionally, in order to achieve improved contrast of a projected image, the following arrangements are made: the polarizing plate 142a adjusts the polarization of the light beam incident on the COLORQUAD™ 159 to a light beam in the first polarization state; the polarizing plate 142b assures the direction of linear polarization of a light beam of a second color is in the second polarization state; and the polarizing plate 142c further adjusts the direction of linear polarization of the light beam projected from the COLORQUAD™ 159 that includes all three colors is in the second polarization state. Furthermore, each of the wavelength-specific, polarization-transforming elements 143a–143d is designed to rotate the direction of linear polarization of each light beam of a particular color a particular amount. The wavelength-specific, polarization-transforming elements 143a and 143d transform the second color light beam to the second polarization state from the first polarization state, and the wavelength-specific, polarization-transforming elements 143*b* and 143*c* transform the first color light beam to the second polarization state from the first polarization state.

With further reference to FIG. 26, the first color light beam is reflected within the illumination light beam separation element 170*a*, transmitted by optical path separation element 150*b*, and irradiates the LCOS 153*a* that modulates the first color light beam. The second color light beam is transmitted through illumination light beam separation element 170*a* and optical path separation element 150*a* and irradiates the LCOS 153*b* that modulates the second color light beam. The third color light beam is reflected within the illumination light beam separation element 170*a* and then is reflected within the optical path separation element 150*b*, and irradiates the LCOS 153*c* that modulates the third color light beam.

Furthermore, the first color light beam is modulated with image information for projection at the first LCOS 153*a* and becomes a light beam of the first polarization state before it is reflected within optical path separation element 150*b* and transmitted through projection light beam synthesis element 160*a* for projection. The second color light beam is reflected as a light beam modulated with image information at the second LCOS 153*b* and becomes a light beam of the first polarization state before it is reflected within optical path separation element 150*a* and projection light beam synthesis element 160*a*. The third color light beam is reflected as a light beam modulated with image information at the third LCOS 153*c* and becomes a light beam of the second polarization state before it is transmitted by optical path separation element 150*b* and projection light beam synthesis element 160*a*. Thus, as shown in FIG. 26, the light beams of the three different colors are combined as they are emitted from the COLORQUAD™ 159.

It has also been proposed to use only two PBSs in order to improve the contrast of a projection display device while achieving lower cost, lighter weight, and improved polarization properties over a construction with four PBSs.

FIG. 27 shows a projection display device that uses reflection-type display elements, particularly LCOS 153*a*–153*c*, each of which is illuminated subsequent to color separation based on wavelengths of light from the illumination light sources. The projection display device of FIG. 27 uses two PBSs in a manner similar to the projection display device of FIG. 26, and light beams containing the image information from the three LCOS 153*a*–153*c* related to different wavelengths are similarly projected through the projection optical system 162*d*. In the projection display device of FIG. 27 a dichroic mirror 170*b* initially divides the light beams according to color rather than a PBS such as PBS 170*a* of FIG. 26 that initially divides the light beams according to polarization state. Similarly, in the projection display device of FIG. 27 a dichroic mirror 160*b* synthesizes the light beams based on wavelength for projection rather than a PBS such as PBS 160*a* that synthesizes the light beams according to polarization state.

In the projection display device shown in FIG. 26, a total of four wavelength-specific, polarization-transforming elements 143*a*–143*d* are present, each of which is either in the illumination optical system (from the light source to the LCOS) or in the projection optical system (from the LCOS to the projection lens), whereas a total of only two wavelength-specific, polarization-transforming elements are arranged in the projection display device of FIG. 27. However, the angle of incidence properties and wavelength selective properties of the wavelength-specific, polarization-transforming elements are not necessarily satisfactory and may be the main causes of deterioration of contrast and deterioration of image formation performance of the projected image.

Concerning these problems, Japanese Laid-Open Patent Application 2001-100155 describes a projection display device that uses two PBSs and does not include any wavelength-specific, polarization-transforming elements. In this publication, a low cost optical system that uses two PBSs is disclosed for a projection display device that uses reflection-type, liquid crystal display elements. This optical system provides separation of a light beam from a light source or device into plural light beams according to wavelengths by a first dichroic mirror and provides a ninety degree rotation of the direction of linear polarization of one of the separated light beams by a polarization-transforming element. This optical system also uses a second dichroic mirror to further separate one of the previously separated light beams according to wavelengths, as well as to synthesize the other of the light beams previously separated by wavelength at the first dichroic mirror with one of the light beams of a different wavelength separated according to wavelengths at the second dichroic mirror. Subsequently, the light beams of the three different wavelengths illuminate different reflection-type, liquid crystal display elements.

The illumination optical system of this projection display device enables two adjacent reflection-type, liquid crystal display elements to be illuminated with light beams of different wavelengths and different polarization states appropriate for operation with an adjacent PBS without using a wavelength-specific, polarization-transforming element while making the entire device compact and decreasing the number of PBSs required. Two light beams having different directions of linear polarization and different wavelengths are emitted in the same direction toward the PBS from the second dichroic mirror that performs both separation and synthesis of various light beams, and the light beam of the other wavelength is emitted in a different direction.

However, there is a problem with this projection display device in that the polarization-transforming element that changes the direction of linear polarization needs to be in relatively close proximity to the light source (namely, in front of the second dichroic mirror), which makes it necessary for the polarization-transforming element to be relatively large.

Additionally, Japanese Laid-Open Patent Application 2001-100155 includes no description of the polarization element used to adjust the polarization direction in the illumination optical system of the projection display device described. However, in order to make a projection display device with a projected image of satisfactory contrast, a polarization element that adjusts the polarization direction is needed in the optical path. Due to the inability to accommodate the polarization element in the optical path where light beams having different polarization directions are present, the polarization element is placed in this optical system closer to the light source than the second dichroic mirror. However, because this position is closer to the light source, the large size of the polarization element and the deterioration of the polarization properties by placing the polarization element far from the PBSs that are adjacent the reflection-type display elements are concerns. It is preferable that the polarization element be arranged closer to the reflection-type display elements and adjacent to the incident side of a PBS.

BRIEF SUMMARY OF THE INVENTION

The present invention relates to color separation and synthesis systems, color separation systems, and color synthesis systems that, through considerations of the required directions of the linearly polarized light and wavelengths of the light beams in such systems, enable an increase in the choices of the arrangements of the optical members and enable enhancing the degree of freedom in the design of these systems, including positioning a polarization-transforming element at a location where it may be relatively small, decreasing the number of wavelength-specific, polarization-transforming elements, and making it possible to position a polarization element adjacent to the incident side of a polarization-sensitive beam splitter, for instance, in an illumination optical system and a projection optical system of a projection display device that uses reflection-type display elements with polarization changing properties. The present invention further relates to color separation and synthesis systems, color separation systems, and color synthesis systems, as well as illumination optical systems and projection optical systems that they may include, systems, and projection display devices including any of such systems, that are compact, of high contrast and with excellent color reproduction, and low in production costs.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1 is a cross-sectional schematic diagram of the color separation and synthesis system of Embodiment 1 of the present invention;

FIG. 2 is a cross-sectional schematic diagram of the color separation and synthesis system of Embodiment 2 of the present invention;

FIG. 3 is a cross-sectional schematic diagram of the color separation and synthesis system of Embodiment 3 of the present invention;

FIG. 4 is a cross-sectional schematic diagram of the color separation and synthesis system of Embodiment 4 of the present invention;

FIG. 5 is a cross-sectional schematic diagram of the color separation and synthesis system of Embodiment 5 of the present invention;

FIG. 6 is a cross-sectional schematic diagram of a color separation and synthesis system of Embodiment 6 of the present invention;

FIG. 7 is a cross-sectional schematic diagram of a color separation and synthesis system of Embodiment 7 of the present invention;

FIG. 8 is a cross-sectional schematic diagram of a color separation and synthesis system of Embodiment 8 of the present invention;

DETAILED DESCRIPTION

Figure 9:
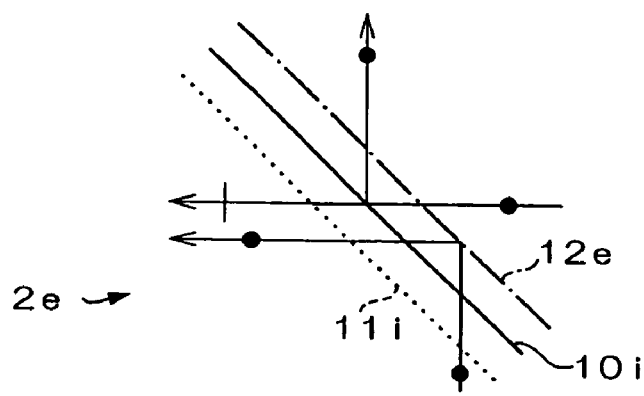
FIG. 9 is a cross-sectional schematic diagram of a color separation and synthesis system of Embodiment 9 of the present invention.
Figure 10:
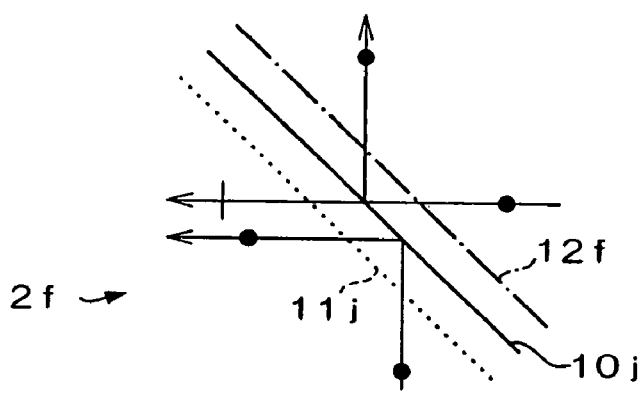
FIG. 10 is a cross-sectional schematic diagram of a color separation and synthesis system of Embodiment 10 of the present invention.
Figure 11:
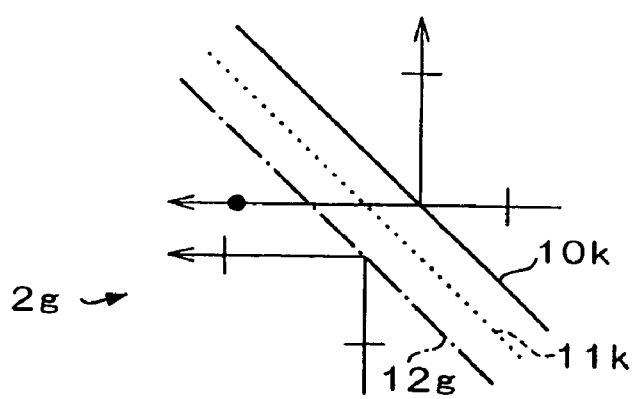
FIG. 11 is a cross-sectional schematic diagram of a color separation and synthesis system of Embodiment 11 of the present invention.
Figure 12:
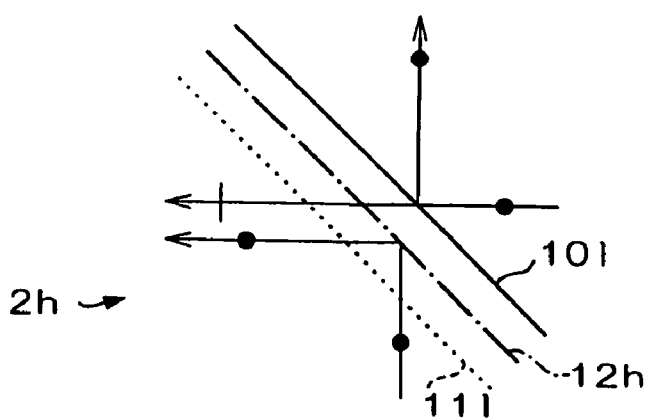
FIG. 12 is a cross-sectional schematic diagram of a color separation and synthesis system of Embodiment 12 of the present invention.
Figure 13:
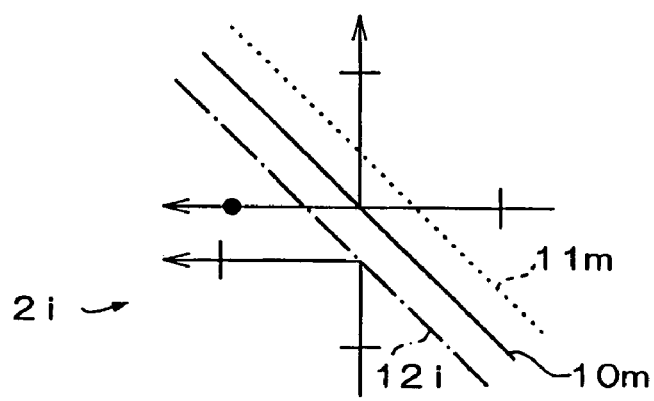
FIG. 13 is a cross-sectional schematic diagram of a color separation and synthesis system of Embodiment 13 of the present invention.

Color separation and synthesis systems, color separation systems, as well as color synthesis systems, that relate to preferred embodiments of illumination optical systems, projection optical systems and projection-type display devices of the present invention that use such systems will be described with reference to FIGS. 1–28.

In particular, color separation and synthesis systems will first be described with reference to FIGS. 1–16. More specifically, Embodiments 1–4 of the color separation and synthesis systems that pertain to a first mode of the color separation and synthesis systems will first be described with reference to FIGS. 1–4, respectively, then Embodiments 5–14 of the color separation and synthesis systems that pertain to a second mode of the color separation and synthesis system will be described with reference to FIGS. 5–14, respectively, and then Embodiments 15 and 16 of the color separation and synthesis systems that pertain to a third mode of the color separation and synthesis system will be described with reference to FIGS. 15 and 16, respectively. Additionally, FIG. 20, more fully described below, is a cross-sectional schematic diagram of a projection display device that may use color separation and synthesis systems of the present invention as one part of the illumination optical system of a projection display device. The term "systems" will be used in the following descriptions to refer generally to the color separation and synthesis systems, color separation systems, color synthesis systems, illumination optical systems, projection optical system, and even to projection display devices that include these systems, of the present invention and characteristics of the various embodiments of the present invention described herein extend to all the systems disclosed herein to which the embodiments described herein are useful.

Color Separation and Synthesis Systems
(Embodiments 1–16)

FIG. 1 is a cross-sectional schematic diagram of Embodiment 1 of the color separation and synthesis systems of the present invention. As shown as 1a in FIG. 1, Embodiment 1 of the color separation and synthesis system of the present invention includes a wavelength-splitting element, which is a dichroic mirror 10a in FIG. 1, that reflects or transmits portions of an incident light beam according to the wavelength of the light and at least one polarization-transforming element, which is a half-wave plate 11a in FIG. 1, that changes the direction of polarization of linearly polarized light of one wavelength and that is arranged adjacent and at least nearly parallel to the wavelength-splitting element. The phrase "arranged adjacent and at least nearly parallel" includes states of the polarization-transforming element and the wavelength-splitting element being superimposed or where they abut one another in a parallel or nearly parallel relationship. The phrase "nearly parallel" encompasses slight variations from parallelism that to at least a first approximation provide the same effects as an exact parallel relationship would provide. A small separation of the polarization-transforming element and the wavelength-splitting element is allowed based on considerations of manufacture. However, the systems will tend to become too large if the separation is too large.

The incident light beam of FIG. 1 includes light of three different wavelengths. In FIG. 1, as well as in FIGS. 2–25, the path of the light beams of each wavelength is shown schematically by straight lines with short intersecting lines and black circles showing the alternative polarization states, either one of the two polarization states (S polarized light and P polarized light) of different polarization direction. Further, in the systems that relate to the present invention, to be described below, and in the color separation and synthesis system 1a, the light beams of the three wavelengths are preferably primary color light beams that are used to create a full color picture image. In particular, light beams of blue, red, and green can correspond in any order to the light beams of three different wavelengths shown in FIG. 1.

As indicated with regard to the three different wavelengths being, for example, blue, red, and green, each light beam of a different wavelength may include light with a band of wavelengths that relate generally to the same color, such as red, blue, or green and is not limited to a monochromatic light beam of only one wavelength. Similarly, as used herein, a light beam of a first, second or third wavelength encompasses a light beam made up of a band of wavelengths that are similarly reflected, transmitted, or have their polarization properties changed by optical elements as described herein.

The color separation and synthesis system of Embodiment 1 is designed for the following operation: the light beams of the first, second, and third wavelengths are variously incident from different directions and undergo color separation and synthesis as shown in FIG. 1. In particular, light beams of the first and third wavelengths are emitted in the same direction linearly polarized in different directions, and a light beam of a second wavelength is emitted in a different direction from which light beams of the first and third wavelengths are emitted.

As shown in FIG. 1, the light beams of the first and second wavelengths are incident from the right side of the page, and the light beam of the third wavelength is incident from the lower side of the page. The color separation and synthesis system 1a undertakes color separation of the light beams of the first and the second wavelengths and also color synthesis of the light beams of the first and third wavelengths; the light beams of the first and third wavelengths are emitted to the left side of the page; and the light beam of the second wavelength is emitted to the upper side of the page. In other words, the dichroic mirror 10a is set so that the light beam of the first wavelength can be transmitted and the light beams of the second and third wavelengths can be reflected.

Furthermore, the light beams of all three wavelengths are in the first polarization state when they are incident to the color separation and synthesis system 1a. Regarding the light beams that are emitted from the color separation and synthesis system 1a, the light beam of the first wavelength is transmitted once through the half-wave plate 11a and emitted in the second polarization state. The light beam of the second wavelength is emitted in the first polarization state without being transmitted through the half-wave plate 11a. The light beam of the third wavelength is transmitted through and back through the half-wave plate so that it is emitted in the first polarization state. In particular, the polarization-transforming element of the present invention is designed to establish a specified optical path length so that when transmitting the light beams that are incident at a specific angle of incidence to this element, the half-wave plate 11a, for example, creates a phase difference of one-half the wavelength of the incident light beam, specifically, for example, an angle of forty-five degrees as shown in FIG. 1.

FIGS. 2–4 show cross-sectional schematic diagrams of Embodiments 2–4 of the color separation and synthesis systems of the present invention, which are referenced by reference numerals 1b–1d in FIGS. 2–4, respectively. The arrangements of Embodiments 2–4 are clear from FIGS. 2–4, respectively, and the description of Embodiment 1 above. Therefore, further detailed descriptions are omitted.

The color separation and synthesis systems 1b14 1d are different from the color separation and synthesis system 1a in at least one way with regard to transmission and reflection properties of the dichroic mirrors 10b–10d, the arrangement of the dichroic mirrors 10b–10d and the half-wave plates 11b–11d, and/or the emitting directions of the light beams of the first, second, and third wavelengths.

However, similar operation may be achieved by having the light beams of the first and second wavelengths incident from different directions so that light beams of first and third wavelengths are still emitted in the same direction linearly polarized in different directions, and a light of a second wavelength is still emitted in a different direction from which light beams of the first and third wavelengths are emitted.

Embodiments 1–4 that relate to a first mode of the color separation and synthesis systems of the present invention include the smallest number of wavelength-splitting elements and polarization-transforming elements (namely, one of each, for a total of two such elements), and the light beams of the first, second, and third wavelengths are all incident on the color separation and synthesis systems linearly polarized in the same direction.

Furthermore, among the color separation and synthesis systems $1a$–$1d$ of Embodiments 1 through 4 that relate to the first mode, Embodiments 1, 3, and 4 are constructed so that a specified light beam is transmitted through and back through the half-wave plate $11a$, $11c$, or $11d$ so that the specified light beam is emitted in the first polarization state, that is, with the same polarization state as the specified light beam is incident on the color separation and synthesis system. Additionally, among the color separation and synthesis systems $1a$–$1d$ of Embodiments 1 through 4 that relate to the first mode, Embodiments 1–3 are constructed so that at least two specified light beams incident from different directions are transmitted through the half-wave plate $11a$, $11b$, or $11c$ to be emitted in the same direction and with different polarization states, as shown with regard to light beams of the first and third wavelengths of Embodiment 1. These constructions effectively enable reducing the number of optical elements and increase the degrees of freedom in designing illumination optical systems and projection display devices.

Embodiments 5–14 of the color separation and synthesis systems that pertain to a second mode of the color separation and synthesis systems will now be described with reference to FIGS. 5–14, respectively.

As shown as $2a$ in FIG. 5, Embodiment 5 of the color separation and synthesis systems of the present invention includes: a wavelength-splitting element, which is a dichroic mirror $10e$ in FIG. 5, that reflects and transmits portions of an incident light beam according to the wavelength of the light; at least one polarization-transforming element, which is a half-wave plate $11e$ in FIG. 5, that changes the direction of polarization of linearly polarized light of one wavelength and that is arranged adjacent and at least nearly parallel to the wavelength-splitting element; and a polarization-sensitive beam splitter, which is a reflection-type polarization-sensitive beam splitter $12a$ in FIG. 5, that reflects or transmits an incident light beam according to the direction of linear polarization of the light beam and that is arranged adjacent and at least nearly parallel to the wavelength-splitting element and the polarization-transforming element.

Similar to Embodiments 1–4 of the first mode, light beams of the first, second, and third wavelengths are variously incident on the color separation and synthesis systems of the second mode in different directions in order to undergo color separation and synthesis. Furthermore, the color separation and synthesis systems of the second mode operate similarly to the systems of the first mode, as follows. In particular, light beams of the first and third wavelengths are emitted in the same direction linearly polarized in different directions, and a light beam of a second wavelength is emitted in a different direction from which light beams of the first and third wavelengths are emitted.

As shown in FIG. 5, the light beams of the first and second wavelengths are incident from the right side of the page, and the light beam of the third wavelength is incident from the lower side of the page. The color separation and synthesis system $2a$ undertakes color separation of the light beams of the first and the second wavelengths and also color synthesis of the light beams of the first and third wavelengths; the light beams of the first and third wavelengths are emitted to the left side of the page; and the light beam of the second wavelength is emitted to the upper side of the page. In other words, the dichroic mirror $10e$ is set so that the light beams of the first and third wavelengths are transmitted and the light beam of the second wavelength is reflected.

Furthermore, the light beams of all three wavelengths are in the second polarization state when they are incident onto the color separation and synthesis system $2a$. Regarding the light beams that are emitted from the color separation and synthesis system $2a$, the incident light beam from the right side of the page of the first wavelength and second polarization state is transmitted by the polarization-sensitive beam splitter $12a$, rotated by the half-wave plate $11e$ to the first polarization state, and then is emitted by the dichroic mirror $10e$ in the first polarization state. The light beam from the right side of the page of the second wavelength and second polarization state is transmitted through the polarization-sensitive beam splitter $12a$, is changed to the first polarization state by the half-wave plate $11e$, is reflected by the dichroic mirror $10e$, transits back through the half-wave plate $11e$, and subsequently is transmitted again through the polarization-sensitive beam splitter $12a$ and emitted in the second polarization state toward the top of the page. In other words, the polarization-sensitive beam splitter $12a$ is set so that the light beam of the second polarization state is transmitted and the light beam of the first polarization state is reflected.

FIGS. 6–13 are cross-sectional schematic diagrams of Embodiments 6–13 of the color separation and synthesis systems of the present invention, which are referenced by reference numerals $2b$–$2i$ in FIGS. 6–13, respectively. The arrangements of Embodiments 6–13 are clear from FIGS. 6–13, respectively, and the description of Embodiment 5 above. Therefore, further detailed descriptions are omitted.

Operation of Embodiments 6–13 similar to the operation of Embodiment 5 is achieved with respect to light beams of the first, second, and third wavelengths that are variously incident from different directions and that undergo color separation and color synthesis. In particular, light beams of the first and third wavelengths are emitted in the same direction linearly polarized in different directions, and light of a second wavelength is emitted in a different direction from which light beams of the first and third wavelengths are emitted.

The color separation and synthesis systems $2b$–$2i$ are different from the color separation and synthesis system $2a$ in at least one way with regard to the transmission and reflection properties of the dichroic mirrors $10f$–$10m$, the arrangement of the dichroic mirrors $10f$–$10m$ and the half-wave plates $11f$–$11m$, the emitting directions of the light beams of the first, second, and third wavelengths, and/or the polarization states of the light beams of the first, second, and third wavelengths at the time of incidence on the color separation and synthesis systems $2b$–$2i$.

However, similar operation may be achieved by having the light beams of the first and second wavelengths incident from different directions so that light beams of the first and third wavelengths are still emitted in the same direction linearly polarized in different directions, and a light beam of a second wavelength is still emitted in a different direction from which light beams of the first and third wavelengths are emitted.

Furthermore, among the color separation and synthesis systems $2a$–$2i$ of Embodiments 5–13 that relate to the second mode, Embodiments 5–10, 12, and 13 are constructed so that a specified light beam is transmitted through and back through the half-wave plate 11e–11j, 11l, or 11m so that the specified light beam is emitted with the same polarization state as the specified light beam is incident onto the color separation and synthesis system. Additionally, among the color separation and synthesis systems 2a–2i of the above Embodiments 5–13, Embodiments 5, 9, 10, and 12 are constructed so that at least two specified light beams incident from different directions are transmitted through the half-wave plate 11e, 11i, 11j, or 11l and are emitted in the same direction and with different polarization states, as shown with regard to the light beams of the first and third wavelengths of Embodiment 5. These constructions effectively enable reducing the number of optical elements and increase the degree of freedom in designing illumination optical systems and projection display devices.

Figure 14:
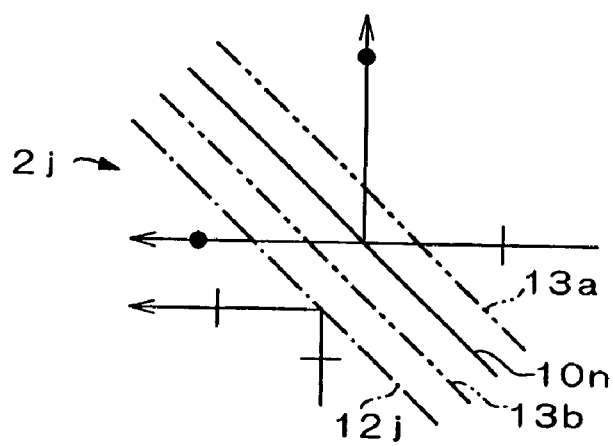
FIG. 14 is a cross-sectional schematic diagram of a color separation and synthesis system of Embodiment 14 of the present invention.

FIG. 14 is a cross-sectional schematic diagram of Embodiment 14 of the color separation and synthesis systems of the present invention. FIG. 14 shows color separation and synthesis system 2j of the second mode of the color separation and synthesis systems of the present invention. The polarization-transforming element according to the present invention is not limited to a single half-wave plate as shown in Embodiments 1–13. As shown in FIG. 14, Embodiment 14 includes two quarter-wave plates 13a and 13b as the polarization-transforming element.

In FIG. 14, the light beams of the first and second wavelengths are incident from the right side of the page and the light beam of the third wavelength is incident from the lower side of the page; the light beams of the first and third wavelengths are emitted to the left side of the page, and the light beam of the second wavelength is emitted to the upper side of the page. The dichroic mirror 10n is set so that the light beam of the first wavelength is transmitted and the light beam of the second wavelength is reflected.

Furthermore, the light beams of all three wavelengths are in the first polarization state when they are incident on the color separation and synthesis system 2j. Regarding the light beams that are emitted from the color separation and synthesis system 2j, the light beam of the first wavelength is transmitted through the quarter-wave plates 13a, 13b and the polarization-sensitive beam splitter 12j in that order, and emitted in the second polarization state. The light beam of the second wavelength is transmitted through and back through the quarter-wave plate 13a and is emitted in the second polarization state. The light beam of the third wavelength is reflected at the polarization-sensitive beam splitter 12j and emitted in the first polarization state. This is different from Embodiments 5–13 in that the color separation and synthesis system 2j transforms the polarization state of the light beam of the second wavelength so that it is emitted in a different polarization state than that in which it is incident. The polarization-sensitive beam splitter 12j, similar to Embodiments 5–13, in the color separation and synthesis system 2j of Embodiment 14 is set so that the light beam of the first polarization state is reflected and the light beam of the second polarization state is transmitted.

Similar to Embodiments 5–13, the color separation and synthesis system 2j of Embodiment 14, which includes a plurality of polarization-transforming elements, operates with light beams of the first, second, and third wavelengths variously incident on the color separation and synthesis system from different directions in order to undergo color separation and synthesis. Also, light beams of the first and third wavelengths are emitted in the same direction linearly polarized in different directions, and a light beam of a second wavelength is emitted in a different direction from which light beams of the first and third wavelengths are emitted.

A desirable feature when a plurality of polarization-transforming elements are used is that the number of times each light beam passes through the polarization-transforming element, such as a quarter-wave plate, should be as nearly the same as possible.

In addition, a reflection-type polarization-sensitive beam splitter is used in the second mode of the color separation and synthesis systems. Because the polarization-sensitive beam splitter operates to direct in different directions light beams that are linearly polarized in different directions, when this system is arranged as an optical system or part of a device, there may be instances where linear polarizing functions may be combined with the polarization-sensitive beam splitter in order to simplify the construction of the system or device.

Color separation and synthesis systems of the second mode operate with light beams of first, second, and third wavelengths that are linearly polarized in the same direction and that are variously incident on the color separation and synthesis systems from different directions.

Figure 15:
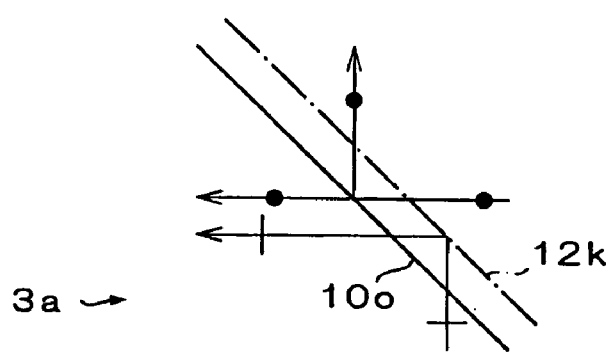
FIG. 15 is a cross-sectional schematic diagram of a color separation and synthesis system of Embodiment 15 of the present invention.

FIG. 15 is a cross-sectional schematic diagram of Embodiment 15 of the color separation and synthesis systems of the present invention that represents a third mode of the color separation and synthesis systems of the present invention. FIG. 15 shows color separation and synthesis system 3a of Embodiment 15 that includes a wavelength-splitting element, which is a dichroic mirror 10o in FIG. 15, and a polarization-sensitive beam splitter, which is a reflection-type polarization sensitive beam splitter 12k in FIG. 15, that reflects or transmits an incident light beam depending on the direction of linear polarization of the incident light beam and that is arranged adjacent and at least nearly parallel to the wavelength-splitting element.

Similar to the first mode of the color separation and synthesis systems of Embodiments 1–4 described above, in this third mode the light beams of the first, second, and third wavelengths are variously incident on the color separation and synthesis systems from different directions. Furthermore, the color separation and synthesis system 3a undertakes color separation of the light beams of the first and the second wavelengths and also color synthesis of the light beams of the first and third wavelengths, the light beams of the first and third wavelengths are emitted in the same direction with different polarization states, and the light beam of the second wavelength is emitted in a different direction.

In FIG. 15 the light beams of the first and second wavelengths are incident from the right side of the page, and the light beam of the third wavelength is incident from the lower side of the page. The color separation and synthesis system 3a undertakes color separation of the light beams of the first and second wavelengths and also color synthesis of the light beams of the first and third wavelengths; the light beams of the first and third wavelengths are emitted to the left side of the page; and the light beam of the second wavelength is emitted to the upper side of the page. In other words, the dichroic mirror 10o is set so that the light beams of the first and third wavelengths are transmitted and the light beam of the second wavelength is reflected. In addition, the color separation and synthesis system 3a is constructed so that the light beam of the third wavelength is transmitted through and back through the dichroic mirror 10o.

Furthermore, the light beams of the first and second wavelengths are incident on the color separation and synthesis system 3a in the second polarization state, and the light beam of the third wavelength is incident on the color separation and synthesis system 3a in the first polarization state. Regarding the light beams that are emitted from the color separation and synthesis system 3a, the light beam of the first wavelength is transmitted through the reflection-type, polarization sensitive beam splitter 12k and emitted in the second polarization state. The light beam of the second wavelength is transmitted through and back through the reflection-type, polarization-sensitive beam splitter 12k and emitted in the second polarization state. The light beam of the third wavelength is reflected by the reflection-type, polarization-sensitive beam splitter 12k and emitted in the first polarization state. In other words, the reflection-type, polarization-sensitive beam splitter 12k is set so that light beams of the first polarization state are reflected and light beams of the second polarization state are transmitted.

Figure 16:
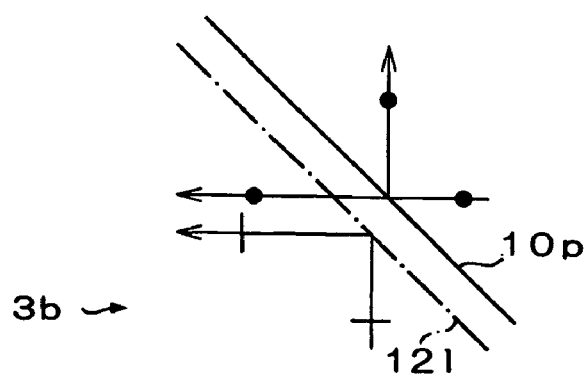
FIG. 16 is a cross-sectional schematic diagram of a color separation and synthesis system of Embodiment 16 of the present invention.

FIG. 16 is a cross-sectional schematic diagram of Embodiment 16 of the color separation and synthesis system 3b of the present invention, which, like Embodiment 15, belongs to a third mode of the color separation and synthesis systems of the present invention. The arrangement of Embodiment 16 is clear from the description of Embodiment 15 above. Therefore, further detailed description is omitted.

As shown in FIG. 16, the color separation and synthesis system 3b of Embodiment 16 is different from the color separation and synthesis system 3a of Embodiment 15 (FIG. 15) in the order of arrangement of the dichroic mirror 10p and the reflection-type polarization sensitive beam splitter 12l, and the dichroic mirror 10p may be set so that the light beam of the first wavelength is transmitted and the light beam of the second wavelength is reflected. However, similar operation may be achieved by having the light beams of the first and second wavelengths incident from different directions so that light beams of the first and third wavelengths are still emitted in the same direction linearly polarized in different directions, and a light beam of a second wavelength is still emitted in a different direction from which light beams of the first and third wavelengths are emitted.

The color separation and synthesis systems of the third mode may be formed with the minimum number of elements, namely a wavelength-splitting element and a polarization sensitive beam splitter, with light beams of first, second, and third wavelengths being variously incident from different directions.

Because a reflection-type polarization sensitive beam splitter is arranged as the polarization splitting plane in the color separation and synthesis system that relates to the third mode in the same manner as in the second mode, when this system is arranged in an optical system or is part of a device, there may be instances where linear polarizing functions may be combined with the polarization sensitive beam splitter in order to simplify the construction of the system or device.

In addition, the color separation and synthesis systems of the present invention described above also have the ability to be used with light paths reversed from those shown in FIGS. 1–16, as generally taught with regard to optical elements, such as lenses. In other words, these systems may be used with light traveling from what is the light emitting side to the light incident side as shown in FIGS. 1–16. In this situation, light beams of the first and third wavelengths are incident from the same direction with their directions of linear polarization being different, and light beams of the first and second wavelengths are emitted with the same direction of linear polarization and in a direction different from the direction in which the light beam of the third wavelength is emitted and the light beam of the second wavelength is incident.

Additionally, in this case, it is preferred that the light beams of the first, second, and third wavelengths that are emitted from the color separation and synthesis systems that relate to the first and the second modes (described above with reference to FIGS. 1–14) be emitted with the same direction of linear polarization. Furthermore, it is preferred that the light beams emitted from the color separation and synthesis systems that relate to the third mode be such that the light beams of the first and second wavelengths have the same direction of linear polarization that is different from the direction of linear polarization of the light beam of the third wavelength.

Color Separation Systems And Color Synthesis Systems (Embodiments 17–19)

Color separation systems and color synthesis systems that relate to preferred embodiments of illumination optical systems, projection optical systems and projection display devices of the present invention that use such systems will now be described with reference to FIGS. 17–19. More specifically, Embodiments 17 and 18 of the present invention, shown in FIGS. 17 and 18, respectively, relate to a first mode of color separation systems, and Embodiment 19 of the present invention, shown in FIG. 19, relates to a second mode of color separation systems.

Figure 17:
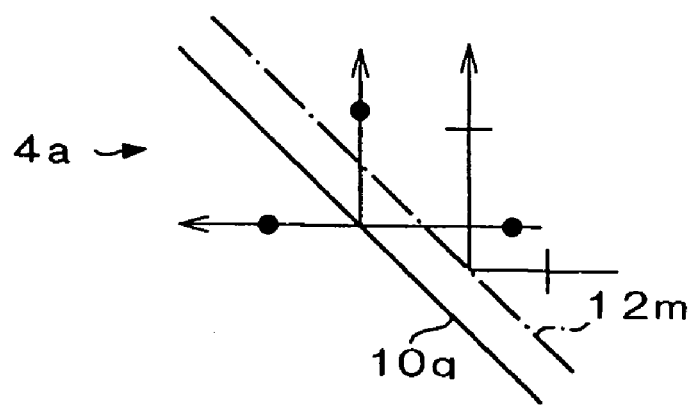
FIG. 17 is a cross-sectional schematic diagram of a color separation system or color synthesis system of Embodiment 17 of the present invention.

As shown in FIG. 17, the color separation system 4a of the present invention includes: a wavelength-splitting element, which is a dichroic mirror 10q in FIG. 17, that reflects or transmits portions of an incident light beam according to the wavelength of the light; and a polarization-sensitive beam splitter, which is a reflection-type, polarization sensitive beam splitter 12m in FIG. 17, that reflects or transmits an incident light beam according to its direction of linear polarization and that is arranged adjacent, and at least nearly parallel, to the wavelength-splitting element.

The color separation systems of the first mode, which include Embodiment 17 of the present invention, operate with light beams of different first, second, and third wavelengths but that are incident on the color separation systems from the same direction. The color separation system undertakes color separation of these light beams by emitting the light beams of the first and third wavelengths in the same direction with different directions of linear polarization and emitting the light beam of the second wavelength in a different direction from the direction in which the light beams of the first and third wavelengths are emitted.

As shown in FIG. 17, the light beams of all three wavelengths are incident from the right side of the page. The color separation system 4a undertakes color separation of the light beam of the second wavelength from the light beams of the first and third wavelengths. The light beams of the first and third wavelengths are emitted to the upper side of the page, and the light beam of the second wavelength is emitted to the left side of the page. In other words, the dichroic mirror 10q is set so that the light beam of the first wavelength is reflected and the light beam of the second wavelength is transmitted.

Furthermore, the light beams of the first and second wavelengths that are incident on the color separation system 4a are in the second polarization state, and the light beam of the third wavelength is in the first polarization state. Regarding the light beams that are emitted from the color separation system 4a, the light beam of the first wavelength is transmitted through and back through the reflection-type polarization sensitive beam splitter 12m and emitted in the second polarization state. The light beam of the second wavelength is transmitted once through the reflection-type polarization sensitive beam splitter 12m and emitted in the second polarization state. The light beam of the third wavelength is reflected at the reflection-type polarization sensitive beam splitter 12m and emitted in the first polarization state. In other words, the reflection-type polarization sensitive beam splitter 12m is set so that light beams of the first polarization state are reflected and light beams of the second polarization state are transmitted.

Figure 18:
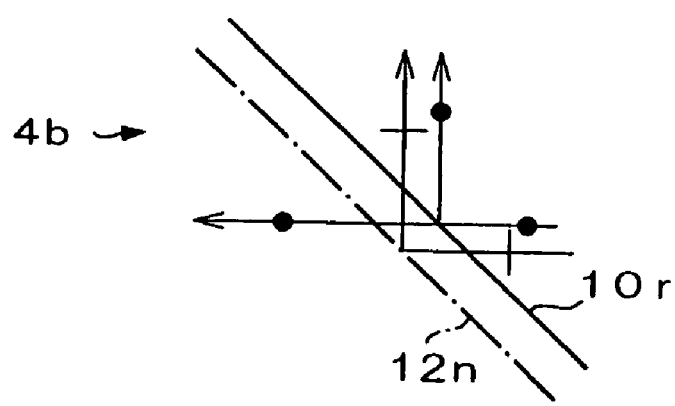
FIG. 18 is a cross-sectional schematic diagram of a color separation system or color synthesis system of Embodiment 18 of the present invention.

FIG. 18 is a cross-sectional schematic diagram of a color separation system 4b of Embodiment 18 of the present invention that also relates to a first mode of the color separation systems. The arrangement of Embodiment 18 is clear from FIG. 18 and the description of Embodiment 17 above. Therefore, further detailed descriptions are omitted.

The color separation system 4b is different from the color separation system 4a in the order of the dichroic mirror 10r and the reflection-type, polarization-sensitive beam splitter 12n. The dichroic mirror 10r is also set so that the light beam of the first wavelength is reflected and the light beams of the second and third wavelengths are transmitted. However, a similar operation to that of Embodiment 17 is achieved with respect to how the light beams of the first, second and third wavelengths undergo color separation, and the light beams of the first and third wavelengths are emitted in the same direction linearly polarized in different directions while the light beam of the second wavelength is emitted in a different direction from the direction in which the light beams of the first and third wavelengths are emitted. Furthermore, the color separation system 4b is constructed so that the light beam of the third wavelength is transmitted through and back through dichroic mirror 10r.

The first mode of the color separation systems of the present invention may be formed with the minimum number of elements, namely, a wavelength-splitting element and a polarization-sensitive beam splitter, with light beams of first, second, and third wavelengths being incident from the same direction.

Figure 19:
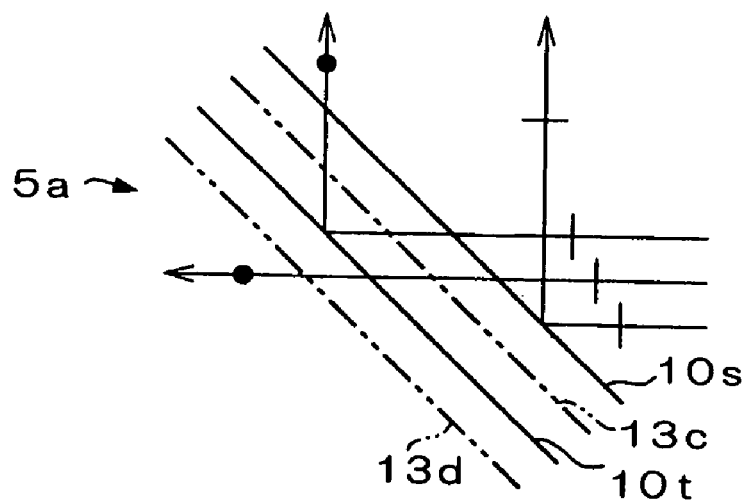
FIG. 19 is a cross-sectional schematic diagram of a color separation system or color synthesis system of Embodiment 19 of the present invention.

FIG. 19 is a cross-sectional schematic diagram of a color separation system 5a of Embodiment 19 of the present invention that also relates to a second mode of the color separation systems. The color separation system 5a of Embodiment 19 includes two wavelength-splitting elements, dichroic mirrors 10s and 10t in FIG. 19, that reflect or transmit an incident light beam according to wavelength and at least two polarization-transforming elements, quarter-wave plates 13c and 13d in FIG. 19, that change the direction of linear polarization of incident light beams that are arranged adjacent and at least nearly parallel to the wavelength-splitting elements.

The color separation system of the second mode, Embodiment 19 shown in FIG. 19, is constructed so that when the light beams of the three different first, second, and third wavelengths are incident on the color separation system in the same direction, the color separation system performs color separation with the light beams of the first and third wavelengths being emitted in the same direction with different directions of linear polarizations, and the light beam of the second wavelength being emitted in a different direction from the direction in which the light beams of the first and third wavelengths are emitted.

In FIG. 19, the light beams of the first, second and third wavelengths are incident from the right side of the page. The color separation system 5a undertakes color separation of the light beam of the second wavelength from the light beams of the first and third wavelengths so that the light beams of the first and third wavelengths are emitted to the upper side of the page and the light beam of the second wavelength is emitted to the left side of the page. In other words, the dichroic mirror 10s is set so that the light beams of the first and second wavelengths are transmitted and the light beam of the third wavelength is reflected, and the dichroic mirror 10t transmits the light beam of the second wavelength and reflects the light beam of the first wavelength.

Furthermore, the light beams of the first, second and third wavelengths that are incident to the color separation system 5a are in the first polarization state. Regarding the light beams that are emitted from the color separation system 5a, the light beam of the first wavelength is transmitted through and back through the quarter-wave plate 13c and emitted in the second polarization state. The light beam of the second wavelength is transmitted once through the quarter-wave plates 13c and 13d and emitted in the second polarization state. The light beam of the third wavelength is emitted in the first polarization state with which it is incident.

The color separation system of the second mode, Embodiment 19 shown in FIG. 19, operates on light beams of the first, second, and third wavelengths that are incident from the same direction and linearly polarized in the same direction.

In addition, the color separation systems of the present invention described above also have the ability to be used with light paths reversed from those shown in FIGS. 17–19, as generally taught with regard to optical elements, such as lenses. In other words, these systems may be used with light traveling from what is the light emitting side to the light incident side as shown in FIGS. 17–19. In this case, the color separation system functions as a "color synthesis system" with light beams of the first and third wavelengths being incident from the same direction with their directions of linear polarization being different, and light beams of the first, second, and third wavelengths being emitted with the same direction of linear polarization and in the same direction that the light beam of the second wavelength is incident.

Furthermore, for this case, it is preferred that the light beams emitted from the color synthesis systems of the first mode, Embodiments 17 and 18, shown in FIGS. 17 and 18, be such that the light beams of the first and second wavelengths have the same direction of linear polarization and the light beam of the third wavelength have a different direction of linear polarization. It is further preferred that the light beams emitted from the color synthesis systems of the second mode, Embodiment 19 shown in FIG. 19, be emitted in the same polarization direction.

Illumination Optical Systems and Projection
Display Devices (Embodiments 20–24)

The first mode of illumination optical systems and projection display devices that use such illumination optical systems of the present invention will be described with reference to FIGS. 20–22, that are cross-sectional schematic diagrams of Embodiments 20–22, respectively, of the present invention. These projection-type display devices include LCOSs 53a–53c that display the image information corresponding to the light beams of the first, second, and third wavelengths, illumination optical systems to illuminate these LCOSs 53a–53c, and projection optical systems for magnified projection of the light beams that have undergone light modulation by these LCOSs 53a–53c. In particular, Embodiment 20 uses the color separation and synthesis system 1a of Embodiment 1 described above, Embodiment 21 uses the color separation and synthesis system 2c of Embodiment 7 described above, and Embodiment 22 uses the color separation and synthesis system 3a of Embodiment 15 described above.

In addition, in FIGS. 20–22, and in FIGS. 23–25 that will be described later, the same reference notation is used for elements that have the same location and similar operation, and reference notations for elements that have similar operation at a different location have the same numeric components.

Figure 20:
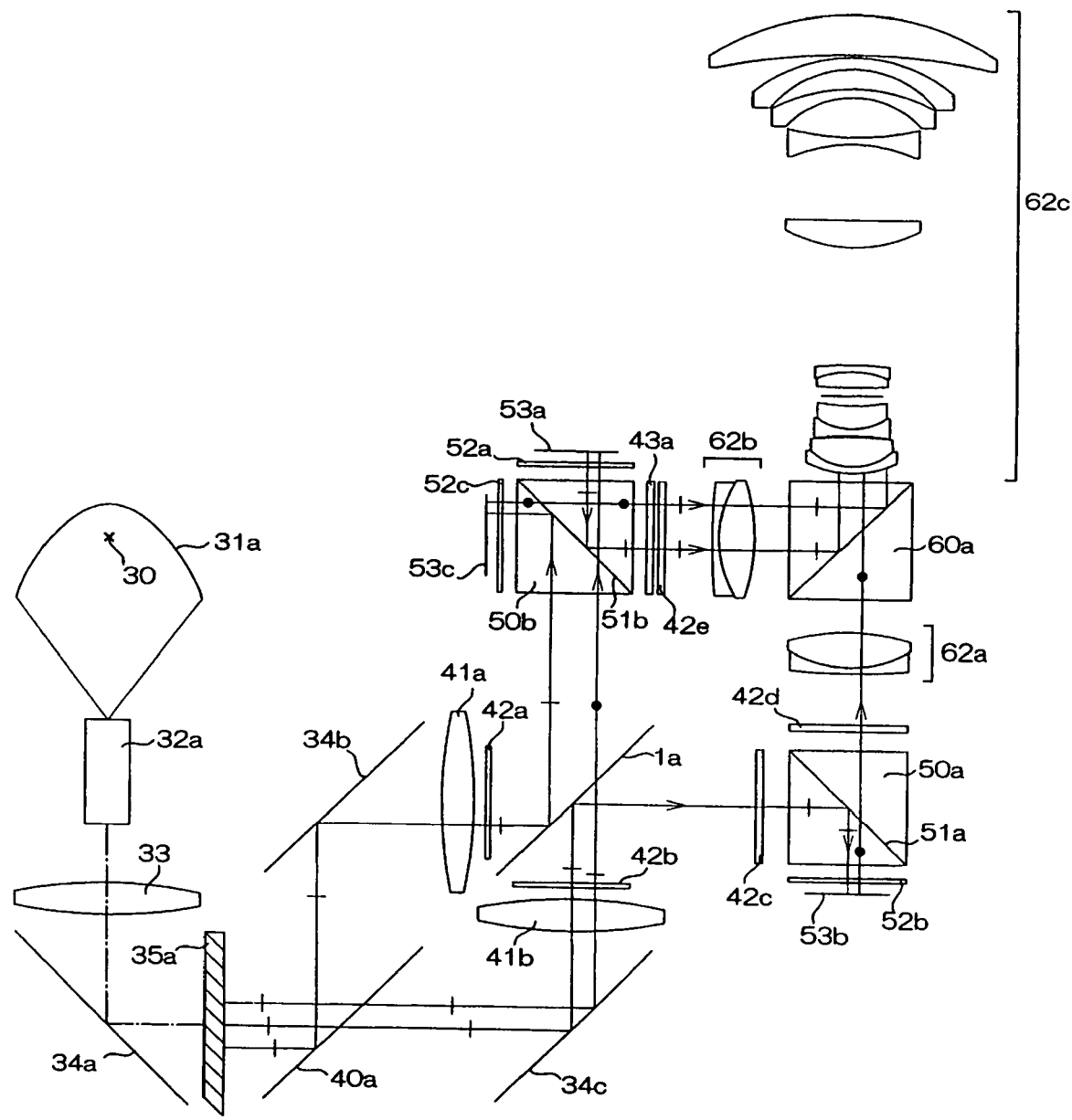
FIG. 20 is a cross-sectional schematic diagram of a projection display device of Embodiment 20 of the present invention.
Figure 21:
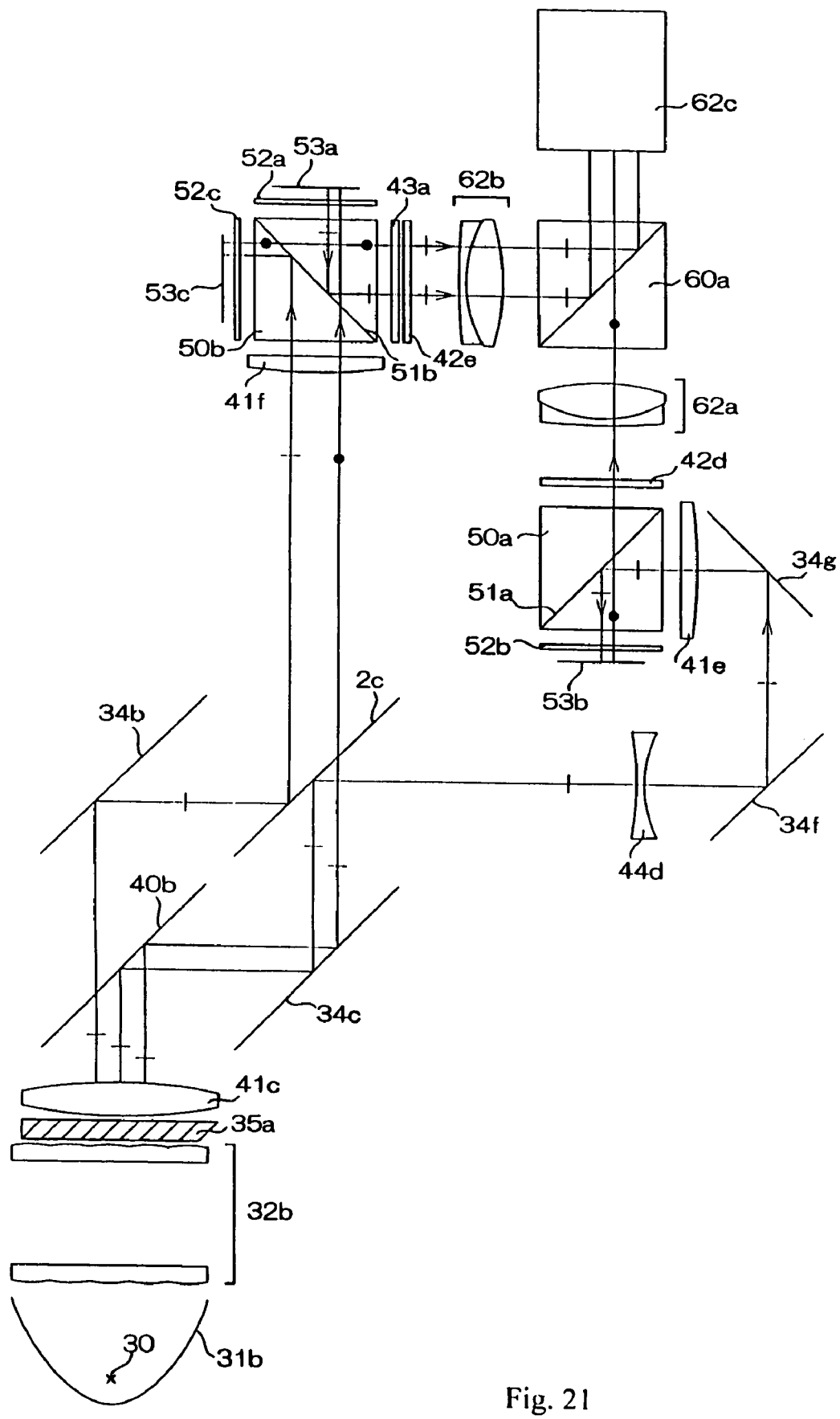
FIG. 21 is a cross-sectional schematic diagram of a projection display device of Embodiment 21 of the present invention.
Figure 22:
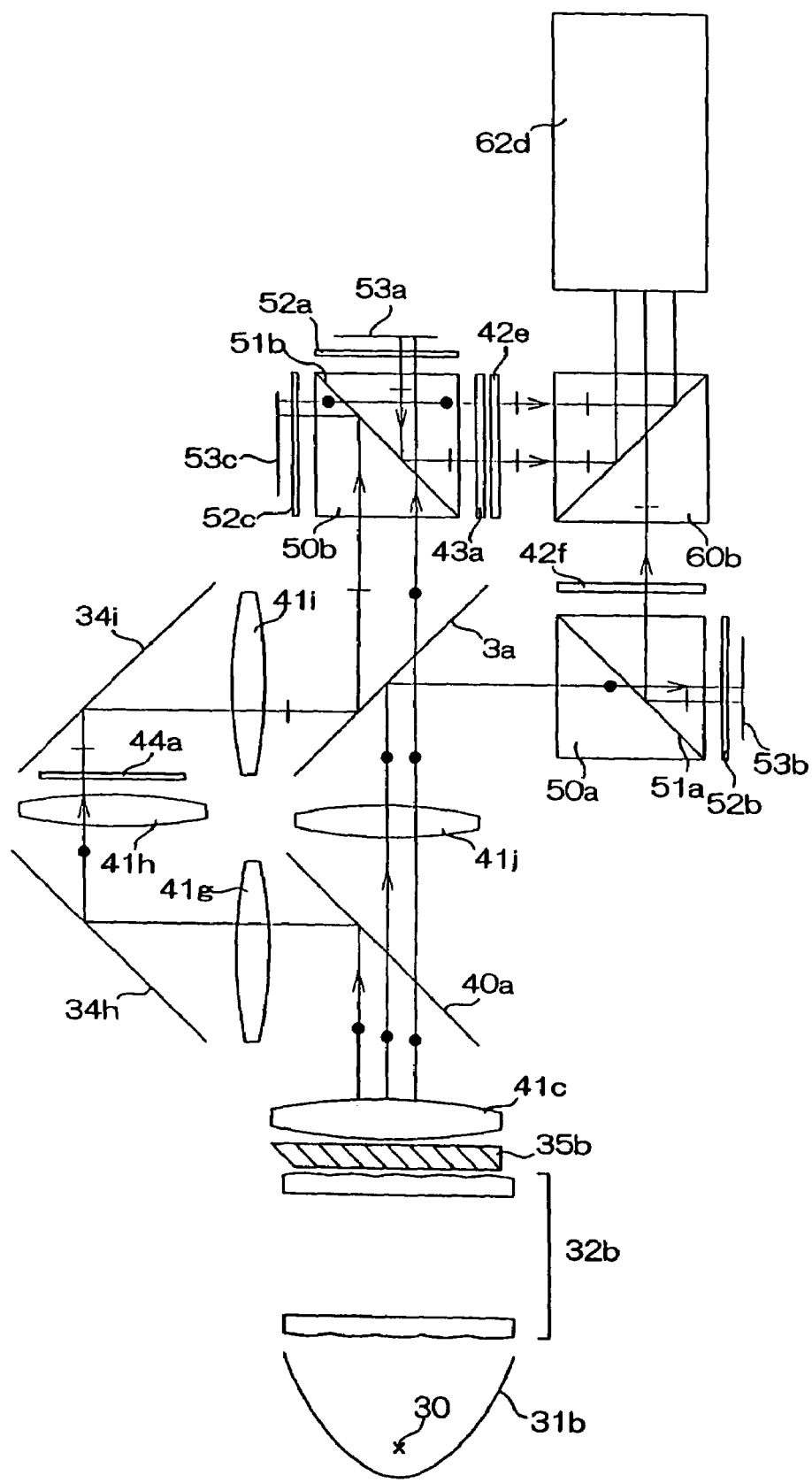
FIG. 22 is a cross-sectional schematic diagram of a projection display device of Embodiment 22 of the present invention.

The illumination optical systems of FIGS. 20–22 variously include a light source 30, reflectors 31a and 31b, integration systems 32a and 32b, a collimator lens 33 in Embodiment 20, polarization-transformation optical systems 35a and 35b, illumination light beam color separation elements 40a and 40b, lenses 41a–41j that operate as condensing lenses or relay lenses, polarizing plates 42a–42c, a half-wave plate 44a in Embodiment 22, total reflection mirrors 34a–34i, color separation synthesis systems 1a, 2c, 3a that relate to the present invention as described previously, optical path separation elements, which are PBSs, arranged immediately before each of the LCOSs 53a–53c, and quarter-wave plates 52a–52c.

Furthermore, the projection optical systems of FIGS. 20–22 variously include the above described optical path separation elements 50a and 50b and quarter-wave plates 52a–52c and further include wavelength-specific, polarization-transforming element 43a, projection light beam synthesis elements 60a and 60b, and projection lenses 62a–62d.

The light source 30 can be a high intensity white light source such as an ultra-high voltage mercury lamp, a metal halide lamp, or similar light source.

The reflector 31a or 31b reflects light from the light source 30 so as to emit the light forward. A concave mirror, such as an ellipsoidal mirror or a parabolic mirror, can be used as the reflector. The reflector 31a is an ellipsoidal mirror, and the reflector 31b is a parabolic mirror.

The integration systems 32a and 32b are for adjusting the intensity distribution of light in a plane perpendicular to the optical axis so that light beams from the light source can be irradiated efficiently to the effective aperture of the LCOSs, and a rod integrator or fly-eye lens may be used for these integration systems. Further, various types of integration systems, such as a stick rod prism that is made of solid glass, a hollow prism where the internal plane is a mirror formed as a reflecting coat, a hybrid-type integrator that is a combination of a stick rod prism and a hollow prism made by arranging the stick rod prism at the light beam incidence side and arranging the hollow prism at the light beam emitting side, a polarization-transforming pipe providing the polarization transformation, or similar devices may be used as rod integrators. The integration system 32a indicates a rod integrator, and the integration system 32b indicates a fly-eye lens.

The polarization-transforming optical systems 35a and 35b transform white light emitted from the light source 30 to linearly polarized light, and their construction is not limited by the schematic illustration. The combinations of the polarization-sensitive beam splitters and the quarter-wave plates of Embodiments 20–22 separate the illuminating light beams into P polarized light and S polarized light and then transform the polarization direction of one of these and emit all the light as parallel light beams with the directions of linear polarization adjusted, which can provide more efficient use of the light. The polarization-transforming element 35a emits the illumination light beams in the first polarization state, and the polarization-transforming element 35b emits the illumination light beams in the second polarization state.

The illumination light beam color separation elements 40a and 40b perform color separation of illumination light beams of specified wavelengths so that light beams of specified wavelengths can be subsequently incident on the color separation and synthesis systems 1a, 2c, and 3a from specified directions, and so that specified light beams can be variously reflected or transmitted by the color separation and synthesis systems 1a, 2c and 3a. Such wavelength-splitting elements are not limited to a dichroic mirror. For example, a prism may be used. The illumination light beam color separation element 40a provides transmission of light beams of the first and second wavelengths and reflection of the light beam of the third wavelength, and the illumination light beam color separation element 40b provides reflection of light beams of the first and second wavelengths and transmission of the light beam of the third wavelength.

The polarizing plates 42a–42f adjust the direction of linear polarization at arranged locations, near the polarization-transforming element, before the second dichroic mirror, and before and after the PBS, which helps prevent deterioration in the contrast and brightness of an image projected on a projection screen. Polarizing plates 42a–42c, 42e, and 42f adjust the polarization direction of light beams of the first polarization state, and the polarizing plate 42d adjusts the polarization direction of a light beam of the second polarization state.

The half-wave plate 44a transform the light beam of the third wavelength of Embodiment 22 from the second polarization state to the first polarization state before it is incident on color separation and synthesis system 3a. In the illumination optical systems and the projection display devices such as Embodiment 22 of the present invention, where the construction is such that the polarization states of the light beams of the first, second, and third wavelengths that are incident on the color separation and synthesis system are different, such as for color separation and synthesis system 3a of Embodiment 22, it is preferable that the polarization state of all the light beams from light source 30 be transformed to a single polarized state by passing together through a polarization-transforming optical system and then the polarized state of one of the desired light beams adjusted again. Therefore, a relay optical system that includes lenses 41g–41i is provided in Embodiment 22 to assist in the proper adjustment of the polarization state of the light beam of the third wavelength.

As shown variously in FIGS. 20–22, the collimator lens 33 and lenses 41a–41j are illustrated schematically, and the composition, such as the number of lens components and lens elements, may be varied.

The optical path separation element 50a, which is a PBS, uses the fact that the illumination light beam of the second wavelength becomes a projection light beam as its linear polarization direction is changed ninety degrees by reflection at the LCOS 53b and transmission back and forth through the quarter-wave plate 52b so that the optical path is divided by transmitting one of either the illumination light beam and the projection light beam by the internal polarization separation filter 51a and by the internal polarization separation filter 51a reflecting the other. In Embodiments 20–25 that relate to the present invention, the polarization separation filter 51a reflects the light beam of the first polarization state and transmits the light beam of the second polarization state. The illumination light beam is reflected and the projection light beam is transmitted in Embodiment 20 and Embodiment 21, and the illumination light beam is transmitted and the projection light beam is reflected in Embodiment 22. In addition, because generally PBS polarized light separation filters are more efficient in reflecting S polarized light than P polarized light, preferably an arrangement where S polarized light is reflected at the PBS is used.

Furthermore, the optical path separation element 50b is also a PBS and is used for separating the optical path of the illumination light beam and the projection light beam by the reflecting and transmitting operation of the internal polarization separation filter 51b, and the illumination light beams of the first and third wavelengths have different linear polarization directions as they are incident on the optical path separation element 50b from the same direction, after which they each irradiate a corresponding one of LCOSs 53a or 53c by transmission or reflection in accordance with their polarization direction. The projection light beams that are reflected at each of the LCOSs 53a and 53c are incident to the optical path separation element 50b once again, are transmitted or reflected according to the polarization direction, and then are emitted in the same direction. In Embodiments 20–25 of the present invention, the polarization separation filter 51b reflects light beams of the first polarization state and transmits light beams of the second polarization state. The illumination light beams of the first wavelength and the projection light beams of the third wavelength are transmitted, and the projection light beams of the first wavelength and the illumination light beams of the third wavelength are reflected in Embodiments 20–22.

The wavelength-specific, polarization-transforming element 43a rotates the direction of linear polarization of a light beam by a specified angle. The wavelength-specific, polarization-transforming element 43a of Embodiments 20–22 transforms light beams of the third wavelength from the second polarization state to the first polarization state.

The projection light beam synthesis elements 60a and 60b synthesize light beams of the first and third wavelengths that are incident from a different direction with light beams of the second wavelength, and emit all the light beams in the same direction. The projection light beam synthesis element 60a is a PBS, and the projection light beam synthesis element 60b is a dichroic prism. In Embodiments 20 and 21, at the projection light beam synthesis elements 60a, which is a PBS, the light beams of the first and third wavelengths are incident in the first polarization state and are reflected and the light beams of the second wavelength are incident in the second polarization state and are transmitted, so that all the light beams are synthesized. Further, at the projection light beam synthesis element 60b, which is a dichroic prism in Embodiment 22, the light beams of the first and third wavelengths are reflected in order to synthesize the light beams.

The projection lenses 62a–62d magnify and project the light beams containing the image information of the projection light beams that are reflected at LCOSs 53a–53c in order to produce a full color image (not shown in the drawings). As shown in FIGS. 20–22, the entire lens systems are shown as the projection lenses 62a–62d that are variously arranged in front of and behind the projection light beam synthesis elements 60a and 60b. For example, as shown in FIG. 21, the projection lens 62a and the projection lens 62c, or the projection lens 62b and the projection lens 62c comprise a projection lens system.

The illumination optical systems of Embodiments 20–22, in the same way as the illumination optical system of Japanese Laid-Open Patent Publication 2001-100155 described above, provide two light beams having different polarization directions and wavelengths to the PBS 50b that is arranged adjacent to two LCOSs 53a and 53c without using a wavelength-specific, polarization-transforming element, which allows lower production costs, as well as preventing deterioration of the contrast and deterioration of the image formed, which may be associated with properties of angle of incidence and wavelength related to wavelength-specific, polarization-transforming elements.

Figure 28:
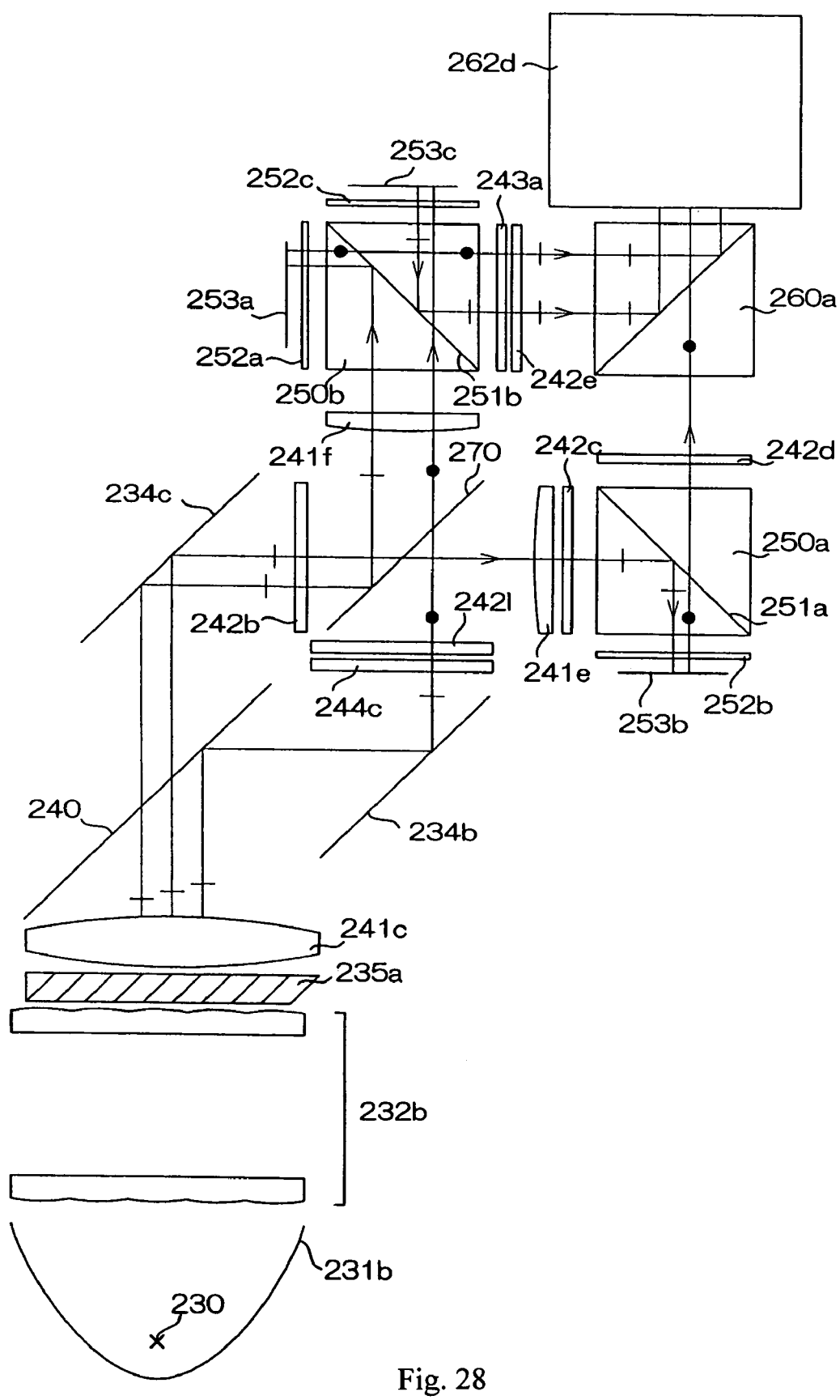
FIG. 28 is a cross-sectional schematic diagram of a projection display device of prior art Example 3.

Furthermore, in order to compare the prior art to the illumination optical systems of Embodiments 20–22, a projection-type display device that provides an illumination optical system that is almost the same as the illumination optical system described in Japanese Laid-Open Patent Publication 2001-100155 is shown in FIG. 28 as prior art Example 3. In FIG. 28, the same reference notation is used for the last two digits of the numbers and for the alphabet letters for elements that have a similar location and similar operation as those of FIGS. 20–22, and otherwise the same reference notation is used for the last two digits of numbers for elements that have similar operation at a different location. Regarding FIG. 28, the detailed descriptions of the elements that have essentially the same operation at the same location with the elements shown in FIGS. 20–22 are omitted.

In the prior art Example 3 of FIG. 28, the illumination light beam separation and synthesis system 270 that is arranged in place of the color separation and synthesis systems 1a, 2c, and 3a of the present invention includes a dichroic mirror that is set so that the light beam of the first wavelength can be reflected and the light beams of the second and third wavelengths can be transmitted. By doing this, the light beams of the first and second wavelengths that are incident from the same direction and the light beam of the third wavelength undergo color separation and color synthesis, and the light beams of the first and third wavelengths are emitted in the same direction with different linear polarization states, and, at the same time, the light beam of the second wavelength is emitted in a different direction from the direction in which the light beams of the first and third wavelengths are emitted.

Furthermore, the half-wave plate 244c transforms the light beam of the third wavelength from the first polarization state to the second polarization state and adjusts the polarization state of the light beam of the third wavelength that is incident on the illumination light beam separation and synthesis system 270. The polarizing plate 242l that follows and is adjacent the half-wave plate 244c adjusts the polarization direction of the light beam of the third wavelength so that it is emitted in the second polarization state. There are no descriptions regarding polarizing elements in Japanese Laid-Open Patent Publication 2001-100155. However, at least some polarizing elements, such as polarizing plates 242b–242e and 242l shown in prior art Example 3, are necessary in order to construct a projection display device that produces an image with satisfactory contrast.

Furthermore, the optical path separation system 250b is a PBS and is arranged for separating the optical paths of the illumination light beams and the projection light beams by reflecting and transmitting operations at the internal polarization separation filter 251b that is practically the same as the optical path separation element 50b, and the polarization separation filter 251b reflects the illumination light beam of the first wavelength and the projection light beam of the third wavelength and transmits the projection light beam of the first wavelength and the illumination light beam of the third wavelength.

When comparing the illumination optical systems of Embodiment 20–22, shown in FIGS. 20–22, and the illumination optical system of prior art Example 3, shown in FIG. 28, it is evident that it is possible, by using the color separation and synthesis systems 1a, 2c, and 3a of the present invention, to construct an illumination optical system so that the polarization-transforming elements are located at positions where they do not cause increases in size, so that the number of wavelength-specific, polarization-transforming elements can be decreased, and so that a generally useful polarization element can be arranged adjacent to the incidence side of the polarization-sensitive beam splitter.

The illumination optical system of Embodiment 20 can be constructed, by using the color separation and synthesis system 1a of the present invention, so that light beams of the first and second wavelengths are incident in the same direction and with the same linear polarization direction and a light beam of the third wavelength having the same linear polarization direction is incident in a different direction from the light beams of the first and second wavelengths, and light beams of the first and third wavelengths are emitted in the same direction with different linear polarization states and the light beam of second wavelength is emitted in a different direction from the direction in which the light beams of the first and third wavelengths are emitted. Therefore, it is not necessary to arrange a polarization-transforming element for transforming the polarization state of the light beam of the third wavelength as is done with regard to illumination light beam color separation element 240 by half-wave plate 244c in prior art Example 3.

In addition to simplifying the processes of alignment and adjustment by reducing the number of independently placed optical elements, in response to the problem of the half-wave plate 244c becoming large due to the light beam diameter being large when placed in close proximity to the light source 230, the half-wave plate 1a (FIG. 1) that is included within the color separation and synthesis system 1a has the ability to provide a smaller scale and lower cost by being placed farther from the light source 30. This is true not only for the color separation and synthesis system 1a of Embodiment 1, but also is true for the projection display devices that use the other color separation and synthesis systems of the first mode of the present invention.

Furthermore, this illumination optical system provides an optical path without a polarization element for adjusting the polarization direction being installed between the color separation and synthesis system 1a and the PBS 50b.

The illumination optical system of Embodiment 21 can be constructed, by using the color separation and synthesis system 2c of the present invention, so that light beams of the first and second wavelengths are incident in the same direction and with the same linear polarization direction and a light beam of the third wavelength having the same linear polarization direction is incident in a different direction from the light beams of the first and second wavelengths, and light beams of the first and third wavelengths are emitted in the same direction with different linear polarization states and the light beam of the second wavelength is emitted in a different direction from the direction in which the light beams of the first and third wavelengths are emitted. Therefore, it is not necessary to arrange a polarization-transforming element such as half-wave plate 244c of prior art Example 3, similar to Embodiment 20.

Furthermore, it is not necessary to arrange an element in order to adjust the polarization direction as with the polarizing plates 242b, 242l, and 242c of prior art Example 3 in this illumination optical system using the color separation and synthesis system 2c of the present invention. The polarizing plate 12c (FIG. 7) is arranged in the color separation and synthesis system 2c as the polarization-sensitive beam splitter in this illumination optical system, and this polarizing plate 12c achieves the equivalent role as the three polarizing plates 242b, 242l, and 242c of prior art Example 3.

In other words, in the color separation and synthesis system 2c, polarizing plate 12c adjusts the polarization direction of the light beam that is transformed to the second polarization state at the half-wave plate 11g by passing through the illumination light beam color separation element 40b, which is a dichroic mirror, for the light beam of the first wavelength. It adjusts the polarization direction of the light beam passing through the illumination light beam color separation element 40b, adjusts a polarization direction of the light beam passing through the dichroic mirror 10g for a light beam of the second wavelength, and adjusts the polarization direction of the light beam passing through the illumination light beam color separation element 40b and the dichroic mirror 10g for a light beam of the third wavelength. Thus, in this illumination optical system, the optical path between the color separation and synthesis system 2c and the PBS 50a, as well as the optical path between the color separation and synthesis system 2c and the PBS 50b, do not require a separate polarizing element for adjusting the polarization direction. Thus, no additional polarizing element for adjusting the polarization direction (other than in the color separation and synthesis system 2c) is needed in this illumination optical system.

In addition to simplifying the processes of alignment and adjustment and lowering costs by reducing the number of independently placed optical elements, the use of the polarizing plate 12c included within the color separation and synthesis system 2c makes a smaller scale and further cost reduction possible over the use of polarizing plates 242b and 242l by it being arranged farther from the light source 30. Furthermore, the polarizing plate 12c enables improvement in contrast and reduction in the deterioration of the polarization properties than with the use of polarizing plates 242b and 242l by its placement closer to the display elements. This is true not only for the color separation and synthesis system 2c of Embodiment 7, but also is true for the projection display devices that use the other color separation and synthesis systems of the second mode of the present invention.

The illumination optical system of Embodiment 22 can be constructed by using the color separation and synthesis system 3a of the present invention, so that light beams of the first and second wavelengths are incident in the same direction with the same linear polarization direction and a light beam of the third wavelength having a different linear polarization direction is incident in a different direction from the light beams of the first and second wavelengths, and light beams of the first and third wavelengths are emitted in the same direction with different linear polarization states and the light beam of second wavelength is emitted in a different direction from the direction in which the light beams of the first and third wavelengths are emitted. Therefore, it is not necessary to arrange elements for adjusting the polarization direction as with the polarizing plates 242b, 242l, and 242c of prior art Example 3, similar to Embodiment 21. In this illumination optical system, the polarizing plate 12k (FIG. 15) is included within the color separation and synthesis system 3a as the polarization-sensitive beam splitter while also playing a role equivalent to the three polarizing plates 242b, 242l, and 242c of prior art Example 3.

In other words, in the color separation and synthesis system 3a, the single polarizing plate 12k adjusts the linear polarization direction of the light beam passing through the illumination light beam color separation element 40a, which is a dichroic mirror, for a light beam of the first wavelength; it adjusts the linear polarization direction of the light beam passing through the illumination light beam color separation element 40a and also adjusts the linear polarization direction of the light beam passing through the dichroic mirror 10o for the light beam of the second wavelength; and it adjusts the linear polarization direction of the luminous flux passing through the dichroic mirror 10o for the light beam of the third wavelength. By doing this, this illumination optical system provides an optical path between the color separation and synthesis system 3a and the PBS 50a, as well as between the color separation and synthesis system 3a and the PBS 50b without the use of a separate polarizing element for adjusting the polarization direction. That is, a polarizing element for adjusting a polarization direction is installed only in the color separation and synthesis system 3a in this illumination optical system.

In addition to simplifying the processes of alignment and adjustment and lowering costs by reducing the number of independently placed optical elements, the use of the polarizing plate 12k included within the color separation and synthesis system 3a makes a smaller device possible and makes possible further cost reduction over the use of polarizing plates 242b and 242l by it being arranged farther from the light source 30. Furthermore, the polarizaing plate 12k enables improvement in contrast and reduction in the deterioration of the polarization properties than with the use of polarizing plates 242b and 242l by its placement closer to the display elements. This is true not only for the color separation and synthesis system 3a of Embodiment 15, but also is true for the projection display devices that use the other color separation and synthesis systems of the second mode of the present invention.

Figure 23:
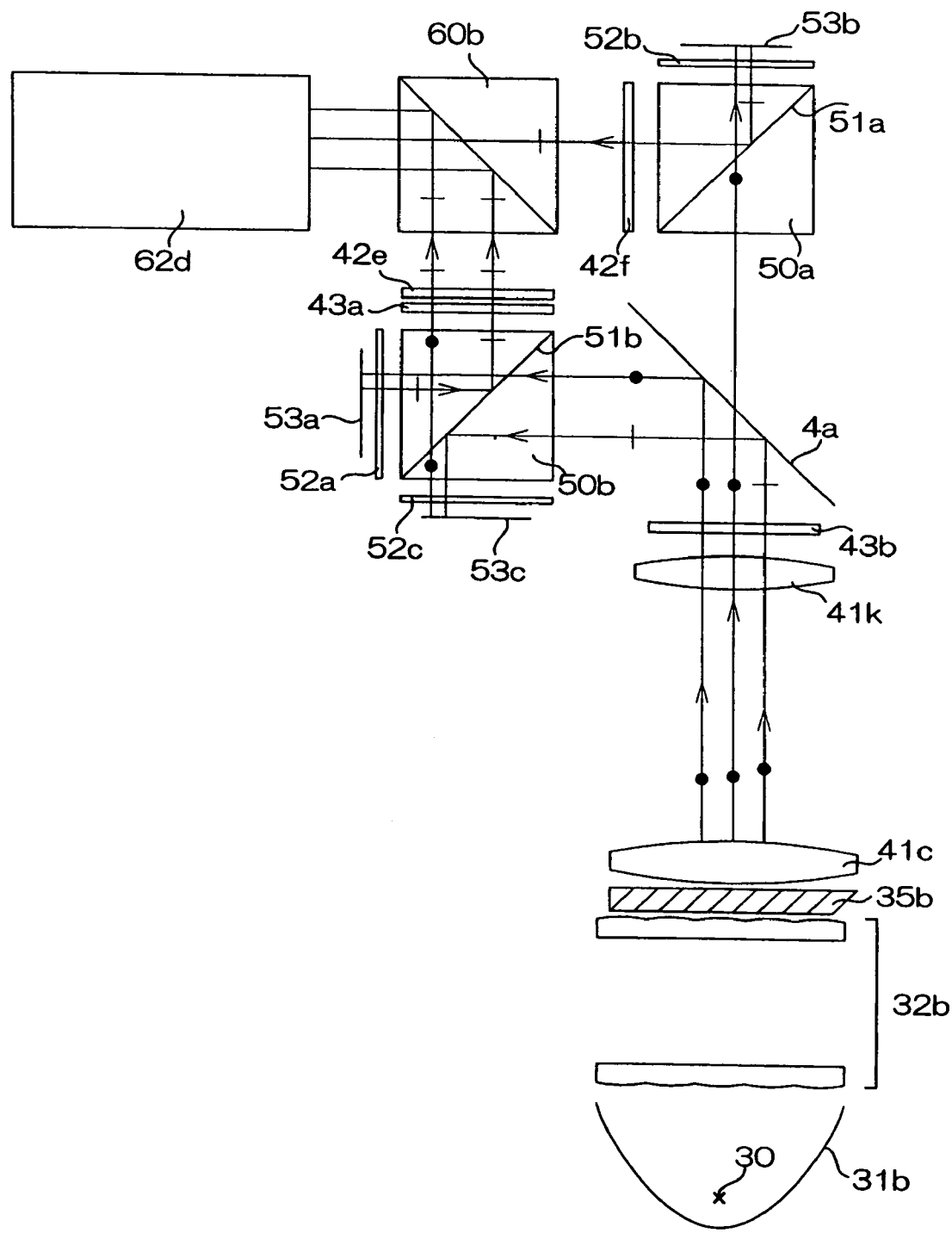
FIG. 23 is a cross-sectional schematic diagram of a projection display device of Embodiment 23 of the present invention.
Figure 24:
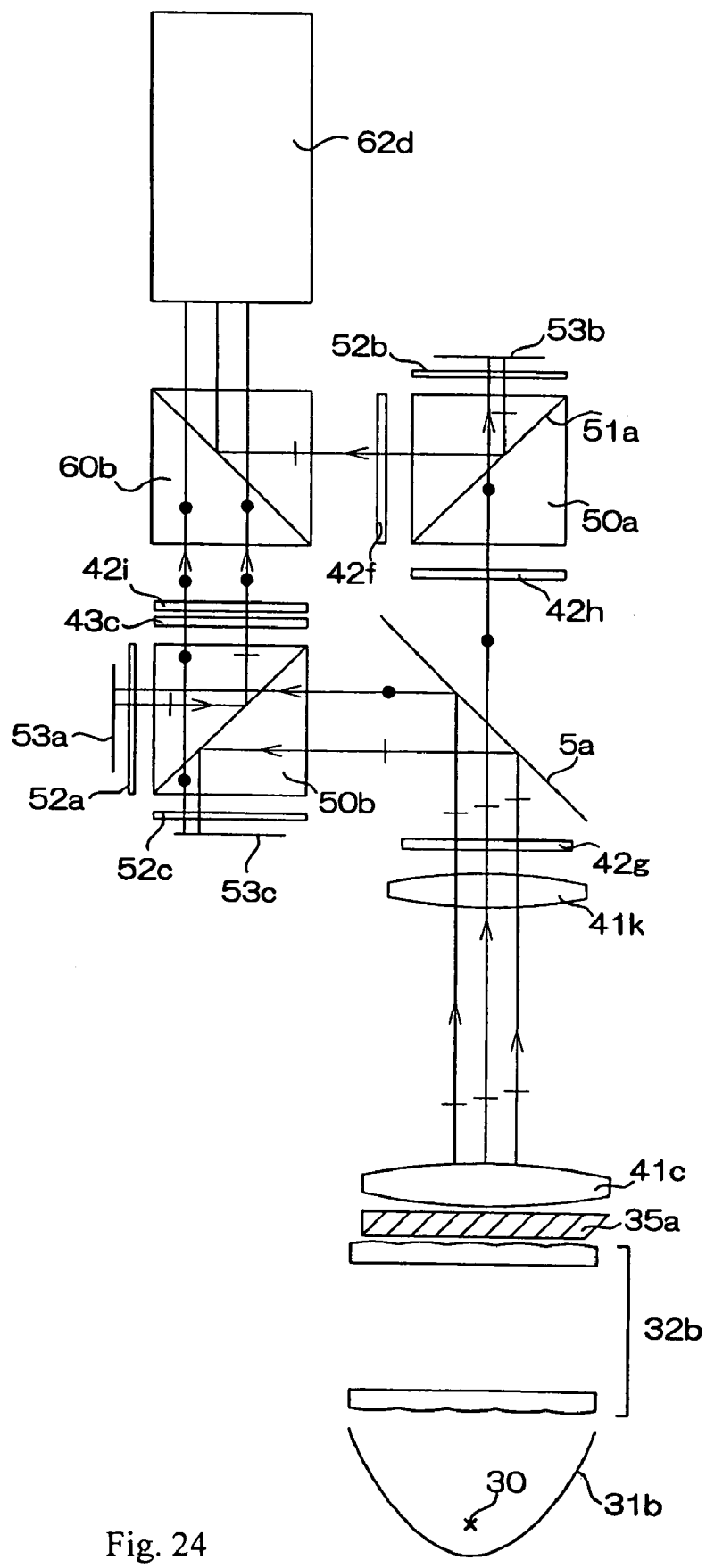
FIG. 24 is a cross-sectional schematic diagram of a projection display device of Embodiment 24 of the present invention.
Figure 25:
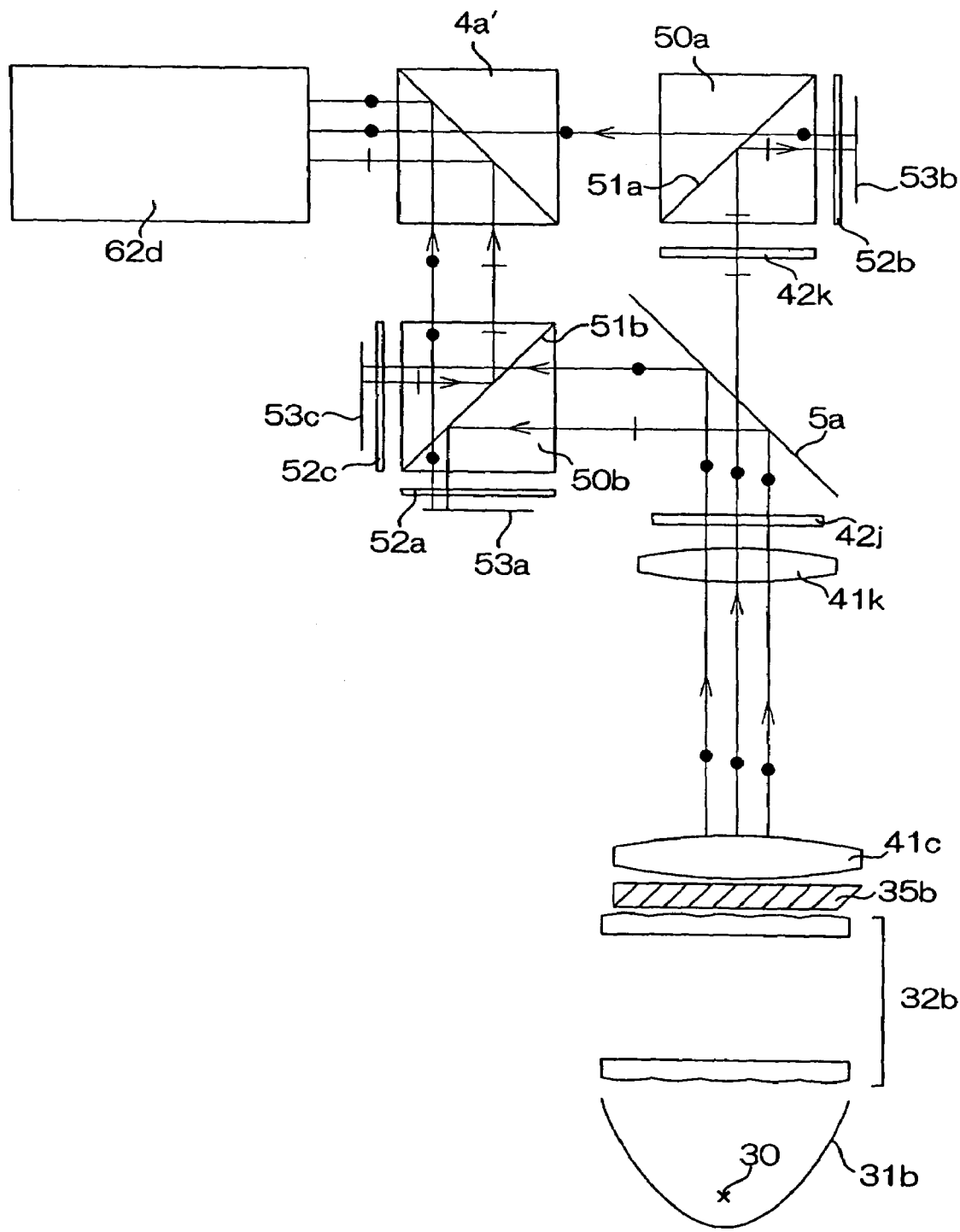
FIG. 25 is a cross-sectional schematic diagram of a projection display device of Embodiment 25 of the present invention.
Figure 26:
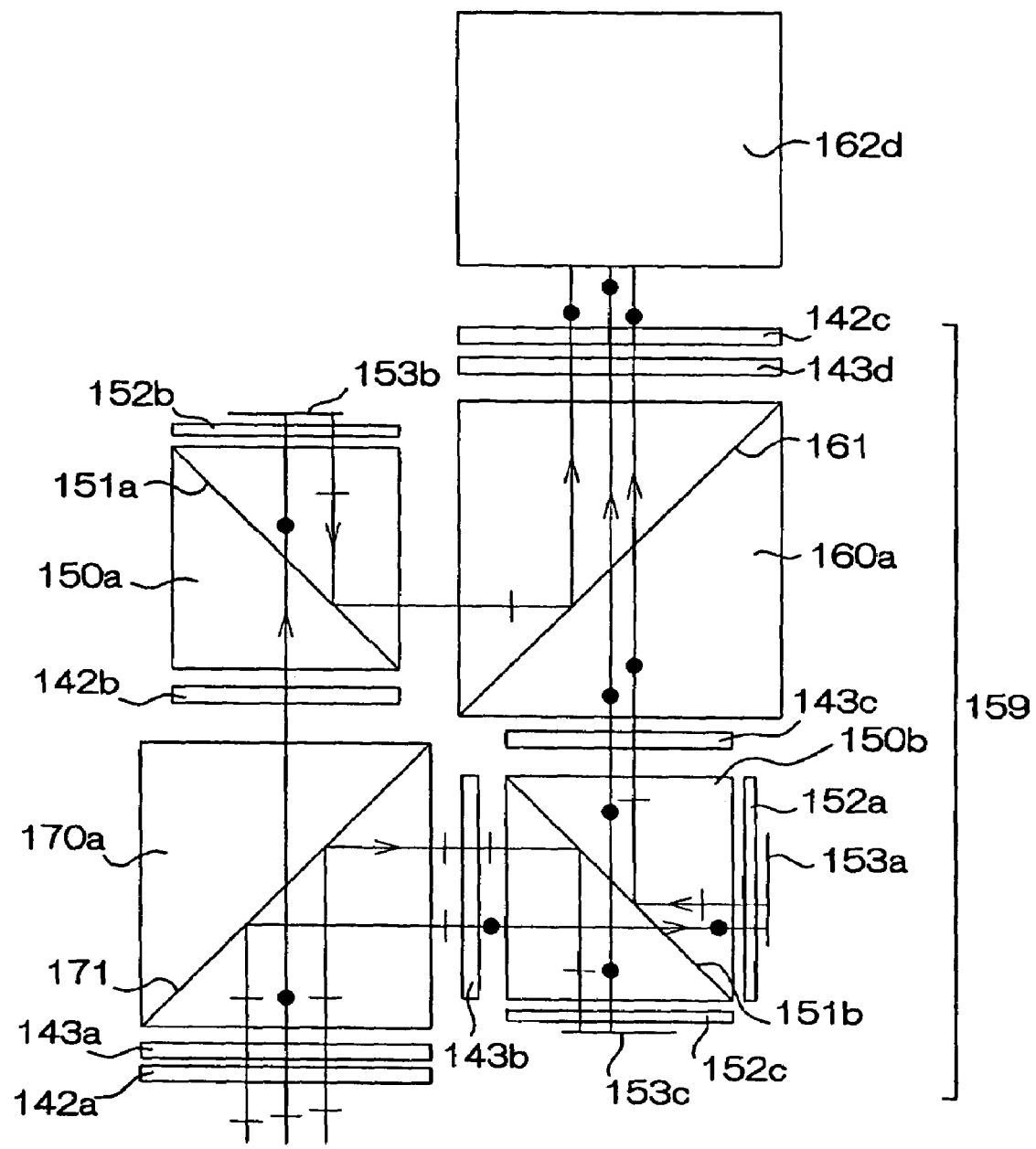
FIG. 26 is a cross-sectional schematic diagram of a projection display device of prior art Example 1.
Figure 27:
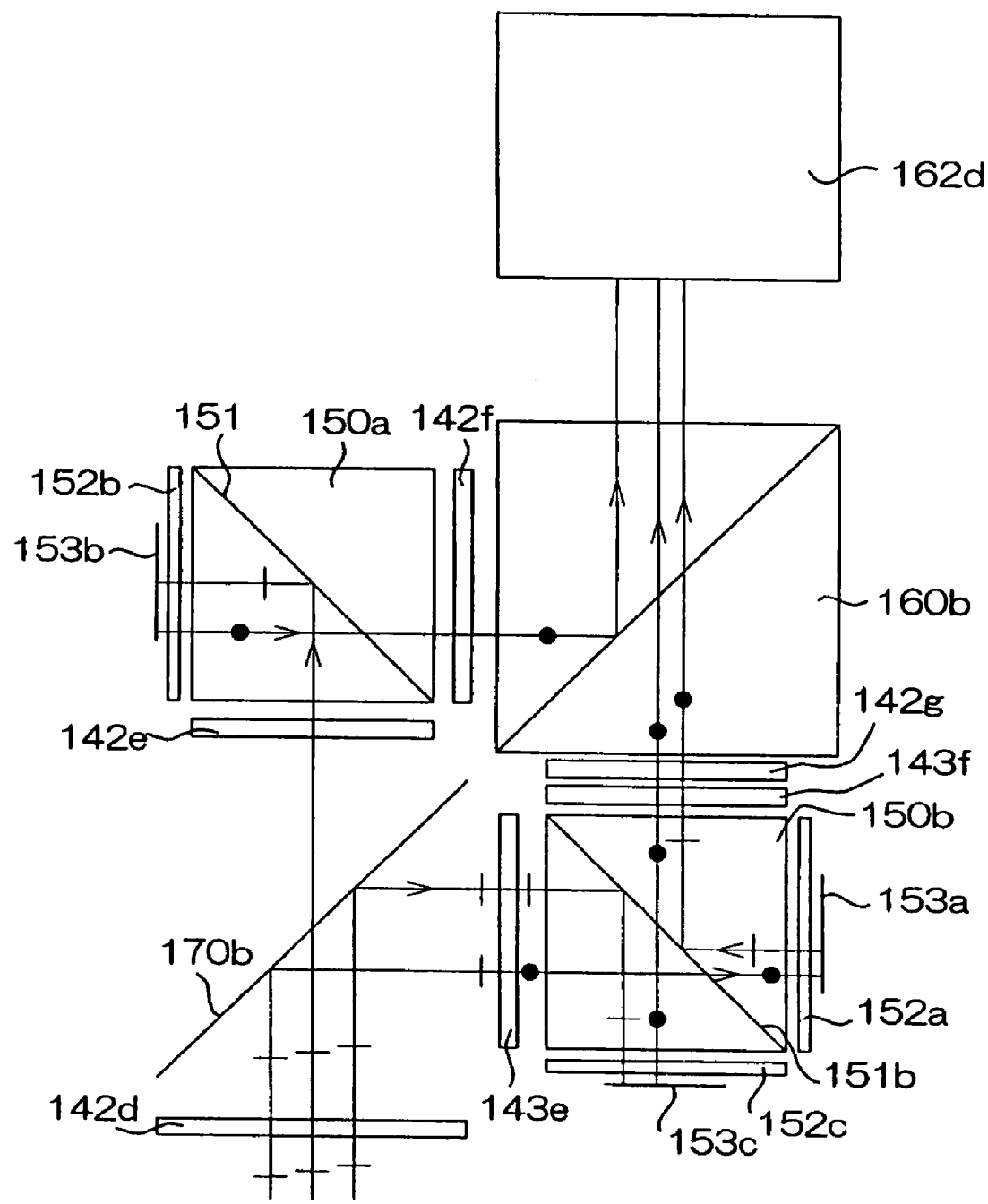
FIG. 27 is a cross-sectional schematic diagram of a projection display device of prior art Example 2.

The second mode of the illumination optical system and the projection display device using it of the present invention are shown in the cross-sectional schematic diagrams of FIGS. 23 and 24, which show Embodiments 23 and 24 of the present invention, respectively. These embodiments use color separation systems of the present invention in illumination optical systems of the present invention. Embodiment 23 uses the color separation system 4a that relates to the above described Embodiment 17, and Embodiment 24 uses the color separation system 5a that relates to the above described Embodiment 19. These projection display devices include, similarly to the illumination optical systems and the projection display devices of Embodiments 20–22: LCOSs 53a–53c that are display elements that display image information corresponding to the light beams of the first, second, and third wavelengths; an illumination optical system to illuminate these LCOSs 53a–53c; and a projection optical system to magnify and project the light beams that undergo light modulation by these LCOSs 53a–53c. Regarding FIG. 23 and FIG. 24, detailed descriptions are omitted for the optical elements that have essentially the same operation at the same location as the devices shown in FIGS. 20–22.

These illumination optical systems include a light source 30, reflector 31b, integration system 32b, polarization-transformation optical systems 35a and 35b, lenses 41c and 41k operating as a condensing lens system, wavelength-specific, polarization-transforming element 43b (Embodiment 23), and polarizing plates 42g and 42h (Embodiment 24). Additionally, color separation systems 4a and 5a that relate to the present invention are provided appropriately, as are optical path separation elements 50a and 50b, each of which is a PBS arranged as shown before the LCOSs 53a–53c, and quarter-wave plates 52a–52c.

Furthermore, the projection optical systems include the previously mentioned optical separation elements 50a and 50b, the quarter-wave plates 52a–52c, polarizing plates 42e, 42f, and 42i, the wavelength-specific, polarization-transforming elements 43a and 43c, the projection light synthesis element 60b, and the projection lens 62d.

The wavelength-specific, polarization-transforming element 43b transforms the light beam of the third wavelength from the second polarization state to the first polarization state in the illumination optical system of Embodiment 23. This determines the polarization state of the light beam of the third wavelength, among the light beams of the first, second, and third wavelengths, as it is incident on the color separation system 4a in the same direction but in a different polarization state than the light beams of the first and second wavelengths. Similarly, the wavelength-specific, polarization-transforming element 43c transforms the light beam of the first wavelength from the first polarization state to the second polarization state in the projection optical system of Embodiment 24.

The polarizing plates 42e–42g adjust the linear polarization direction of light beams in the first polarization state and the polarizing plates 42h and 42i adjust the linear polarization direction of the light beams in the second polarization state. The lenses 41c and 41k are shown schematically, and their construction, as well as the number of lenses, may be modified appropriately.

The optical path separation element 50a transmits the illumination light beam of the second wavelength in Embodiment 23 and Embodiment 24 and reflects the projection light beam. Furthermore, the optical path separation element 50b transmits the illumination light beam of the first wavelength and the projection light beam of the third wavelength in Embodiment 23 and Embodiment 24 and reflects the projection light beam of the first wavelength and the illumination light beam of the third wavelength.

The projection light beam synthesis element 60b is a dichroic prism, the light beams of the first and third wavelengths are reflected in Embodiment 23, and the light beam of the second wavelength is transmitted and synthesized. Furthermore, the light beams of the first and third wavelengths are transmitted in Embodiment 24, and the light beam of the second wavelength is reflected and synthesized.

As a representative example of color separation systems of the present invention, the illumination optical systems of Embodiment 23 and Embodiment 24 increase the choices of the arranging positions of the optical members more than those shown in Embodiments 20–22 by using the color separation systems 4a and 5a of the present invention in these optical systems, and thereby the degree of freedom in the design of various optical systems of the present invention are increased. The color separation systems 4a and 5a are designed to achieve an operation that undertakes color separation of the light beams of first, second, and third wavelengths that are incident from the same direction, the light beams of the first and third wavelengths are emitted in the same direction with different directions of linear polarization, and the light beam of the second wavelength is emitted in a different direction from the direction in which the light beams of the first and third wavelengths are emitted. Therefore, a more simple and compact arrangement from the light source 30 to the color separation systems 4a and 5a than that shown in Embodiment 20-Embodiment 22 may be achieved.

The illumination optical system of Embodiment 23, by using the color separation and synthesis system 3a of the present invention, is constructed so that light beams of the first and second wavelengths with the same linear polarization direction and a light beam of the third wavelength having a different linear polarization direction are all incident in the same direction, and light beams of the first and third wavelengths are emitted in the same direction with different linear polarization states and the light beam of second wavelength is emitted in a different direction from the direction in which the light beams of the first and third wavelengths are emitted. Therefore, it is not necessary to arrange polarizing elements separate from the polarization-transforming element. By decreasing the number of separate optical elements, lower costs and simplified alignment of the optical elements can be achieved. In the illumination optical system of Embodiment 23, the polarization-sensitive beam splitter 12m is arranged within the color separation system 4a (FIG. 17) and acts as a polarizing plate as well as a polarization-sensitive beam splitter so that this polarization-sensitive beam splitter 12m plays a role equivalent to a plurality of polarizing plates.

In other words, the color separation system 4a is constructed so that the single polarization-sensitive beam splitter 12m can adjust the polarization direction of the light beam of the first wavelength passing through the dichroic mirror 10q, can adjust the polarization direction by transmitting the light beam of the second wavelength, and can adjust the polarization direction of the light beam of the third wavelength that is transformed to the first polarization state at the wavelength-specific, polarization-transforming element 43b. By doing this, in this illumination optical system, an optical path between the color separation system 4a and the PBS 50a, as well as the color separation system 4a and the PBS 50b, does not need to include a polarizing element for adjusting a polarization direction. Rather, the polarizing element for adjusting a polarization direction is installed only in the color separation system 4a in this illumination optical system.

The single polarization-sensitive beam splitter 12m included within the color separation and synthesis system 4a is arranged relatively far from the light source 30, and this makes possible miniaturization and lower cost. Further, the polarization-sensitive beam splitter 12m is arranged comparatively near to the display elements, and this makes possible improvement in the contrast of a projected image while decreasing the deterioration of the polarization properties. Furthermore, contrast can be improved even if the polarization-sensitive beam splitter 12m is the only polarizing plate included within the illumination optical system because the light is used so efficiently.

This is true not only for the color separation and synthesis system 4a of Embodiment 17, but also is true for the projection display devices that use the other color separation and synthesis systems of the first mode of the present invention.

In the illumination optical system of Embodiment 24, by using the color separation and synthesis system 5a of the present invention, the light beams of the first, second and third wavelengths with the same linear polarization direction are all incident from the same direction, and the light beams of the first and third wavelengths are emitted in the same direction with different linear polarization states, and the light beam of second wavelength is emitted in a different direction from the direction in which the light beams of the first and third wavelengths are emitted. Therefore, it is not necessary to arrange the wavelength-specific, polarization-transforming element 43b before the color separation system 5a as in Embodiment 23, which avoids reduced contrast in a projected image and deterioration of imaging performance, while at the same time lowers production costs. By decreasing the number of separate optical elements, lower cost and simplified alignment can be achieved. In this illumination optical system, the optical paths between the color separation system 5a and the PBS 50a, as well as the color separation system 5a and the PBS 50b, do not need to include a polarizing element for adjusting the polarization direction. This is true not only for the color separation system 5a of Embodiment 19, but also is true for the projection display devices that use the other color separation systems of the second mode of the present invention.

Projection Optical Systems And Projection Display Devices (Embodiment 25)

A mode of projection optical systems and projection display devices using embodiments of the present invention will be described below with reference to FIG. 25 that schematically shows Embodiment 25 that includes a projection optical system and projection display device of the present invention. This device uses a color synthesis system 4a' of the present invention as one part of the projection optical system. Additionally this device uses the color separation system 5a of the present invention as one part of the illumination optical system.

This projection display device includes, similar to the projection display devices of Embodiments 20–24, the LCOSs 53a–53c that are display elements to display the image information corresponding to the light beams of the first, second, and third wavelengths, an illumination optical system to illuminate these LCOSs 53a–53c, and a projection optical system to magnify and project the light beams that have been modulated with image information by these LCOSs 53a–53c. Regarding FIG. 25, the detailed descriptions are omitted for those optical elements having essentially the same operation at the same location as the devices shown in FIGS. 20–24.

The illumination optical system includes a light source 30, a reflector 31b, an integration system 32b, a polarization-transformation optical system 35b, lenses 41c and 41k that operate as a condensing lens system, polarizing plates 42j and 42k, and a color separation system 5a that relates to the present invention, and further includes the optical path separation elements 50a and 50b, which are PBSs, arranged immediately before each of the LCOSs 53a–53c, and the quarter-wave plates 52a–52c.

This illumination optical system is of nearly the same construction as that shown in Embodiment 24 that provides the color separation system 5a. However, the polarization state of each light beam is switched from the first polarization state to the second polarization state in FIG. 25. This illumination optical system includes a polarization-transformation optical system 35b that emits the illumination light beams in the second polarization state, a polarizing plate 42j for adjusting the polarization direction of the light beams in the second polarization state, and a polarizing plate 42k for adjusting the polarization direction of the light beam in the first polarization state. Further, the optical path separation element 50a reflects the illumination light beam of the second wavelength and transmits it as a projection light beam. Furthermore, the optical path separation element 50b reflects the projection light beam of the third wavelength and the illumination light beam of the first wavelength and transmits the projection light beam of the first wavelength and the illumination light beam of the third wavelength.

The projection optical system includes the previously mentioned optical path separation elements 50a and 50b, quarter wave-plates 52a–52c, and further includes a color synthesis system 4a' for synthesizing the projection light beams, as well as projection lens 62d.

The color synthesis system 4a' of Embodiment 25 arranges the color separation system 4a shown in FIG. 17 so that light can proceed from the light emitting side of the color separation system 4a to the light incidence side. In other words, the color synthesis system 4a' is arranged to operate so that the light beam of the first wavelength in the second polarization state, as well as the light beam of the third wavelength in the first polarization state, that are incident from the bottom side of the page as shown in FIG. 25 and the light beam of the second wavelength that is incident from the right side of the page are all emitted in the same direction to the left side of the page. The color synthesis system 4a', in this manner, synthesizes all three light beams that have undergone light modulation by the LCOSs 53a–53c to be one light beam that is emitted in a single direction, which is towards the projection lens 62d. In the present Embodiment, because the color synthesis system 4a' is formed as a prism with its incidence plane and its emitting plane perpendicular to the optical axis of the projection optical system, and because the dichroic mirror 10q and the reflection-type, polarization-sensitive beam splitter 12m are arranged adjacent and at least nearly parallel within this prism, the aberration correction is satisfactory and the amount of light that is lost is very low.

As described above, the dichroic mirror 10q is set so that the light beam of the first wavelength is reflected and the light beam of the second wavelength is transmitted, and the reflection-type, polarization-sensitive beam splitter 12m is set so that the light beam of the first polarization state is reflected and the light beam of the second wavelength is transmitted. Regarding the light beam that is incident on the color synthesis system 4a', the light beam of the first wavelength is transmitted through the reflection-type, polarization-sensitive beam splitter 12m, reflected at the dichroic mirror 10q, transmitted through the reflection-type, polarization-sensitive beam splitter 12m once again, and then emitted in the second polarization state. The light beam of the second wavelength is transmitted through the dichroic mirror 10q and the reflection-type, polarization-sensitive beam splitter 12m, and then emitted in the second polarization state. The light beam of the third wavelength is reflected at the reflection-type, polarization-sensitive beam splitter 12m and emitted in the first polarization state.

As is evident from the projection optical system of Embodiment 25 using the color synthesis system 4a', according to the projection optical system using the color synthesis system of the present invention, it is not necessary to arrange a wavelength-specific, polarization-transforming element or a polarizing element in order to adjust the polarization direction of the light beam either between the optical path separation element 50a and the color synthesis system 4a' or between the optical path separation element 50b and the color synthesis system 4a', which is different from Embodiments 20–24. In the projection optical system of Embodiment 25, because the polarization-sensitive beam splitter 12m is arranged within the color synthesis system 4a' as a polarization-sensitive beam splitter, the polarization direction can be adjusted at a position that follows the polarization-sensitive beam stage of the optical path separation elements 50a and 50b, which are PBSs, for the light beams of the first and third wavelengths. In addition to simplifying alignment and lowering cost by reducing the number of polarizing plates, devising the simplification of the alignment adjustment process and the low cost by the reduction of the polarizing plates, an improvement to the contrast and brightness can be achieved. Further, because it is not necessary to use the wavelength-specific, polarization-transforming element that may not necessarily be satisfactory in wavelength properties and incidence angle properties, in addition to the lowering of costs, deterioration of the imaging performance can be prevented and reduction in contrast further prevented.

The projection-type display device of Embodiment 25 uses the color separation system 5a and the color synthesis system 4a' of the present invention in the illumination optical system and the projection optical system, respectively. Similar effects can be expected when other color separation and synthesis systems or color separation systems of the present invention are used in the illumination optical system, and when other color synthesis systems that relate to the present invention are used in a projection display device that uses a projection optical system.

The color separation and synthesis systems, the color separation systems, as well as the color synthesis systems of the present invention, and the illumination optical systems, the projection optical systems and the projection display devices of the present invention that use the color separation and synthesis systems, the color separation systems, and the color synthesis systems of the present invention are not limited to the embodiments described above, but may be modified in various ways. For instance, the color separation and synthesis systems, the color separation systems, and the color synthesis systems may not only variously use a dichroic mirror and dichroic prism, but may use a hologram, for example, as a wavelength-splitting element. In addition, various manufacturing methods may be used to make various elements, for example, layers that may be laminated are not limited to being formed by vapor deposition or sputtering techniques as other laminating or coating techniques may be used. Also, crystals may be used that achieve the same optical effects. Furthermore, in the color separation and synthesis systems, the color separation systems, and the color synthesis systems, a polarization-transforming element is not limited to a half-wave plate or a quarter-wave plate, as variously shown in the embodiments described above, but any element that changes the polarization direction of a light beam may be used. Also, a plurality of polarization-transforming elements may be used in one system to achieve the same effects as a single polarization-transforming element as shown in the embodiments described above. Additionally, in the color separation and synthesis systems, the color separation systems, and the color synthesis systems, a polarization-sensitive beam splitter is not limited to a reflection-type, polarization-sensitive beam splitter. Furthermore, the color separation and synthesis systems, the color separation systems, and the color synthesis systems are not limited to the embodiments described above, but the color separation and synthesis systems, the color separation systems, and the color synthesis systems can be freely varied by considering the polarization states and wavelengths of the light beams. For the construction of the illumination optical systems, the projection optical systems, and the projection display devices, at least one of the color separation and synthesis systems, the color separation systems, and the color synthesis systems of the present invention may be provided, but they are not limited otherwise in their construction.

In order to make the color reproducibility of the projected image satisfactory in a projection display device, a method of arranging an optical element that decreases the light intensity of a light beam of a specified wavelength is known. For instance, in the spectral distribution of wavelength in the visible region of an extra-high-pressure mercury lamp, the red wavelength component within the three primary color lights is less in intensity than the other components, and, on the other hand, a peak of light intensity occurs in the yellow wavelength region. Therefore, using this light source, the color picture image as a whole is tinged with a yellowish color. Accordingly, illumination may be performed by decreasing the light intensity of light in the wavelength region in the vicinity of 580 nm for the light emitted from the light source. The illumination optical system of the present invention can also make the color reproducibility satisfactory through arranging an optical element which decreases the light intensity of a specified wavelength component for at least one of the optical paths within the luminous fluxes which are incident on color separation and synthesis systems or color separation systems of the present invention as well as the light beams that are emitted from color separation and synthesis systems or color separation systems of the present invention. In addition, "decreasing the light intensity," as described above, includes reducing the light intensity of a certain wavelength or wavelength region to zero.

In addition, the color separation and synthesis systems, color separation systems, and color synthesis systems of the present invention are not limited to those where light beams of three different wavelengths are used. Systems where two or four or more light beams of different wavelengths are used may be included in the present invention and such systems may variously provide additional degrees of freedom in the design of the optical systems of the present invention.

Furthermore, the color separation and synthesis systems, color separation systems, and color synthesis systems of the present invention are not limited to constructions where the light beams are incident from two different directions or from the same direction. For instance, systems where the light beams are incident from three or more different directions may be possible, and such systems may variously provide additional degrees of freedom in the design of the optical systems of the present invention.

The present invention is not limited to the aforementioned embodiments, nor to the variations described above, as it will be obvious that various alternative implementations are possible. All such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A color separation and/or synthesis system for receiving at least two incident light beams whose wavelengths are different from each other, comprising:
   a wavelength-splitting element that reflects linearly polarized light of one wavelength and transmits light of another wavelength; and
   a polarization-transforming element that changes the direction of polarization of linearly polarized light of one wavelength and that is arranged adjacent and at least nearly parallel to the wavelength-splitting element;
wherein
   a linearly polarized light beam of one wavelength that is incident on the color separation and/or synthesis system, is emitted from the color separation and/or synthesis system with a direction of linear polarization that is different from its direction of linear polarization upon incidence, and a linearly polarized light beam of another wavelength that is incident on the color separation and/or synthesis system is emitted from the color separation and/or synthesis system in a different direction than its direction of propagation upon incidence.

2. A color separation and synthesis system for receiving incident light from different directions and emitting light in different directions, comprising:
   a wavelength-splitting element that reflects linearly polarized light of one wavelength and transmits linearly polarized light of another wavelength; and
   a polarization-transforming element that changes the direction of polarization of linearly polarized light of one wavelength and that is arranged adjacent and at least nearly parallel to the wavelength-splitting element;
wherein
   the color separation and synthesis system operates on first and second linearly polarized light beams of different wavelengths that are incident on the color separation and synthesis system from one direction, and operates on a third linearly polarized beam of a wavelength different from each of said first and second linearly polarized light beams and that is incident on the color separation and synthesis system from another direction so that the first and third linearly polarized light beams are emitted from the color separation and synthesis system in the same direction but with directions of linear polarization that are different from one another, and the second linearly polarized light beam is emitted from the color separation and synthesis system in a direction that is different from said same direction.

3. The color separation and synthesis system of claim 2, wherein the three light beams of different wavelengths are incident on the color separation and synthesis system with the same direction of linear polarization.

4. The color separation and synthesis system of claim 2, wherein at least one of the three light beams passes twice through the polarization-transforming element.

5. The color separation and synthesis system of claim 3, wherein at least one of the three light beams passes twice through the polarization-transforming element.

6. The color separation and synthesis system of claim 2, wherein at least two of the three light beams that are incident on the color separation and synthesis system from directions that are different pass through the polarization-transforming element at least once.

7. The color separation and synthesis system of claim 3, wherein at least two of the three light beams that are incident on the color separation and synthesis system from directions that are different pass through the polarization-transforming element at least once.

8. An illumination optical system, comprising:
   the color separation and/or synthesis system of claim 1; and a light source that emits light of three different wavelengths;

wherein the illumination optical system provides light to the color separation and/or synthesis system so that a linearly polarized light beam of a first wavelength is incident on the color separation and/or synthesis system in a direction that is different from the direction in which linearly polarized light beams of the second and third wavelengths are incident on the color separation and/or synthesis system;

the linearly polarized light beam of the second wavelength is emitted from the color separation and/or synthesis system in a direction different from the direction in which the linearly polarized light beams of the first and third wavelengths are emitted from the color separation and/or synthesis system; and the three linearly polarized lights beams of first, second, and third wavelengths that are emitted from the color separation and/or synthesis system illuminate different illumination areas.

9. The illumination optical system of claim 8, and further comprising a polarization-transforming optical system positioned between the light source and the color separation and synthesis system for producing linear polarizations in the same direction for the three light beams of different wavelengths that are incident on the color separation and synthesis system.

10. The illumination optical system of claim 8, and further comprising an integration system for making the cross-sectional intensity of light emitted from the light source more uniform.

11. The illumination optical system of claim 8, and further comprising an optical element for decreasing the intensity of one of the linearly polarized light beams before it is incident on the color separation and synthesis system or after it is emitted from the color separation and synthesis system.

12. The illumination optical system of claim 8, and further comprising a polarization-sensitive beam splitter that reflects light having one direction of linear polarization and transmits light having another direction of linear polarization, and that is positioned in an optical path of linearly polarized light of one wavelength emitted from the color separation and synthesis system;

wherein an optical path of a linearly polarized light beam of one wavelength from the color separation and synthesis system to the polarization-sensitive beam splitter does not include a polarization-transforming element.

13. The illumination optical system of claim 8, wherein the illumination optical system does not include a polarization-transforming element outside the color separation and synthesis system.

14. An illumination optical system, comprising:

the color separation and/or synthesis system of claim 1;

wherein the linearly polarized light beams of different wavelengths are emitted from the color separation and/or color synthesis system in different directions so that they illuminate different illumination areas.

* * * * *

UNITED STATES PATENT AND TRADEMARK OFFICE
CERTIFICATE OF CORRECTION

PATENT NO. : 7,220,002 B2  
APPLICATION NO. : 10/954185  
DATED : May 22, 2007  
INVENTOR(S) : Yamamoto It is certified that error appears in the above-identified patent and that said Letters Patent is hereby corrected as shown below:

Column 5  
Line 9, change "degree" to -- degrees --;

Column 11  
Line 14, change "increase the degree" to -- increasing the degrees --;

Column 18  
Line 31, change "transform" to -- transforms --;  
Line 45, change "light beams adjusted" to -- light beams is adjusted --;

Column 21  
Line 37, change "plate 1a" to -- plate 11a --;

Column 24  
Line 56, change "degree" to -- degrees --; and

Column 25  
Line 67, change "beam of second" to -- beam of the second --.

Signed and Sealed this

Eighteenth Day of March, 2008

JON W. DUDAS  
*Director of the United States Patent and Trademark Office*